US011526907B2

(12) United States Patent
Farhadi et al.

(10) Patent No.: US 11,526,907 B2
(45) Date of Patent: Dec. 13, 2022

(54) SINGLE-PASS MATCHING IN LARGE DATA STREAMS

(71) Applicant: ADOBE INC., San Jose, CA (US)

(72) Inventors: Alireza Farhadi, College Park, MD (US); Ryan A. Rossi, Santa Clara, CA (US); Tung Mai, San Jose, CA (US); Anup Rao, San Jose, CA (US)

(73) Assignee: ADOBE INC., San Jose, CA (US)

( * ) Notice: Subject to any disclaimer, the term of this patent is extended or adjusted under 35 U.S.C. 154(b) by 593 days.

(21) Appl. No.: 16/688,700

(22) Filed: Nov. 19, 2019

(65) Prior Publication Data

US 2021/0150568 A1 May 20, 2021

(51) Int. Cl.
*G06F 16/2455* (2019.01)
*G06F 16/735* (2019.01)
*G06F 16/901* (2019.01)
*G06Q 30/02* (2012.01)

(52) U.S. Cl.
CPC ... *G06Q 30/0251* (2013.01); *G06F 16/24568* (2019.01); *G06F 16/735* (2019.01); *G06F 16/9024* (2019.01)

(58) Field of Classification Search
CPC .......... G06Q 30/0251; G06F 16/24568; G06F 16/735; G06F 16/9024
See application file for complete search history.

(56) References Cited

U.S. PATENT DOCUMENTS

| | | | |
|---|---|---|---|
| 11,003,717 B1* | 5/2021 | Eswaran | G06F 16/21 |
| 11,093,548 B1* | 8/2021 | Pang | G06F 16/2477 |
| 11,262,926 B1* | 3/2022 | Animesh | G06F 3/061 |
| 2020/0210481 A1* | 7/2020 | Niebielski | G06F 16/9024 |
| 2020/0265090 A1* | 8/2020 | Hilloulin | G06F 16/9024 |
| 2021/0049171 A1* | 2/2021 | Ziauddin | G06F 16/9024 |
| 2021/0097108 A1* | 4/2021 | Goyal | G06F 16/90335 |
| 2021/0294662 A1* | 9/2021 | Goyal | G06F 16/9014 |
| 2022/0091909 A1* | 3/2022 | Kolchinsky | G06F 16/2453 |
| 2022/0114178 A1* | 4/2022 | Haprian | G06F 16/9024 |

(Continued)

OTHER PUBLICATIONS

Forestiero et al., "A Single Pass Algorithm for Clustering Evolving Data Streams Based On Swarm Intelligence", Nov. 2, 2011, Springer, pp. 1-26 (Year: 2011).*

(Continued)

*Primary Examiner* — Jorge A Casanova
(74) *Attorney, Agent, or Firm* — Shook, Hardy & Bacon L.L.P.

(57) ABSTRACT

Embodiments of the present invention provide systems, methods, and computer storage media for determining an increased matching for large graphs in which an increased matching is generated for the graph by leveraging an initial matching for a small fraction of edges of the large graph. An initial matching for a random subset of edges of an input graph is leveraged to generate alternating paths based on the initially matched edges and the remaining edges, not included in the random subset. An increased matching for the entire graph includes the alternating paths without the initial matched edges, thus increasing the number of matched edges in the increased matching by at least one for every initially matched edge. Graph-based tasks may then be triggered based on the increased matching.

20 Claims, 8 Drawing Sheets

(56) References Cited

U.S. PATENT DOCUMENTS

2022/0179857 A1\* 6/2022 Kompella .......... G06F 16/2465

OTHER PUBLICATIONS

Farhadi, Alireza, et al. "Approximate Maximum Matching in Random Streams." Proceedings of the Fourteenth Annual ACM-SIAM Symposium on Discrete Algorithms. Society for Industrial and Applied Mathematics, 2020. 27 pages.
Assadi, Sepehr, et al. "Coresets meet EDCS: algorithms for matching and vertex cover on massive graphs." Proceedings of the Thirtieth Annual ACM-SIAM Symposium on Discrete Algorithms. Society for Industrial and Applied Mathematics, 2019.
Bernstein, Aaron, and Cliff Stein. "Fully dynamic matching in bipartite graphs." International Colloquium on Automata, Languages, and Programming. Springer, Berlin, Heidelberg, 2015. 34 pages.
Chitnis, Rajesh, et al. "Kernelization via sampling with applications to finding matchings and related problems in dynamic graph streams." Proceedings of the twenty-seventh annual ACM-SIAM symposium on Discrete algorithms. Society for Industrial and Applied Mathematics, 2016. 19 pages.
Crouch, Michael, and Daniel M. Stubbs. "Improved streaming algorithms for weighted matching, via unweighted matching." Approximation, Randomization, and Combinatorial Optimization. Algorithms and Techniques (APPROX/RANDOM 2014). Schloss Dagstuhl-Leibniz-Zentrum fuer Informatik, 2014. 9 pages.
Epstein, L., Levin, A., Mestre, J., and Segev, D. (2011). Improved approximation guarantees for weighted matching in the semi-streaming model. SIAM J. Discrete Math., 25(3):1251-1265. 12 pages.
Esfandiari, Hossein, MohammadTaghi Hajiaghayi, and Morteza Monemizadeh. "Finding large matchings in semi-streaming." 2016 IEEE 16th International Conference on Data Mining Workshops (ICDMW). IEEE, 2016. 7 pages.
Feigenbaum, Joan, et al. "Graph distances in the streaming model: the value of space." SODA. vol. 5. 2005. 12 pages.
Feigenbaum, Joan, et al. "On graph problems in a semi-streaming model." Departmental Papers (CIS) (2005): 236. 14 pages.
Gamlath, Buddhima, et al. "Weighted matchings via unweighted augmentations." Proceedings of the 2019 ACM Symposium on Principles of Distributed Computing. 2019. 41 pages.
Ghaffari, Mohsen, and David Wajc. "Simplified and Space-Optimal Semi-Streaming for $(2+\epsilon)$—Approximate Matching." arXiv preprint arXiv:1701.03730 (2017). 9 pages.
Goel, Ashish, Michael Kapralov, and Sanjeev Khanna. "On the communication and streaming complexity of maximum bipartite matching." Proceedings of the twenty-third annual ACM-SIAM symposium on Discrete Algorithms. Society for Industrial and Applied Mathematics, 2012. 47 pages.
Kale, Sagar, and Sumedh Tirodkar. "Maximum matching in two, three, and a few more passes over graph streams." arXiv preprint arXiv:1702.02559 (2017) 22 pages.
Kapralov, Michael. "Better bounds for matchings in the streaming model." Proceedings of the twenty-fourth annual ACM-SIAM symposium on Discrete algorithms Society for Industrial and Applied Mathematics, 2013. 27 pages.
Kapralov, Michael, Sanjeev Khanna, and Madhu Sudan. "Approximating matching size from random streams." Proceedings of the twenty-fifth annual ACM-SIAM symposium on Discrete algorithms. Society for Industrial and Applied Mathematics, 2014. 18 pages.
Konrad, Christian. "A simple augmentation method for matchings with applications to streaming algorithms." 43rd International Symposium on Mathematical Foundations of Computer Science (MFCS 2018). Schloss Dagstuhl-Leibniz-Zentrum fuer Informatik, 2018. 16 pages.
Konrad, Christian, Frédéric Magniez, and Claire Mathieu. "Maximum matching in semi-streaming with few passes." Approximation, Randomization, and Combinatorial Optimization. Algorithms and Techniques. Springer, Berlin, Heidelberg, 2012. 231-242. 25 pages.
McGregor, Andrew. "Finding graph matchings in data streams." Approximation, Randomization and Combinatorial Optimization Algorithms and Techniques Springer, Berlin, Heidelberg, 2005. 170-181. 12 pages.
Paz, Ami, and Gregory Schwartzman. "A $(2+€)$-Approximation for Maximum Weight Matching in the Semi-Streaming Model." Proceedings of the Twenty-Eighth Annual ACM-SIAM Symposium on Discrete Algorithms. Society for Industrial and Applied Mathematics, 2017. 16 pages.
Lovász, L., and M. D. Plummer. "Matching Theory, vol. 29 of Ann." Chapters 1, 3, and 9. Discrete Math. North-Holland Publishing Co., Amsterdam (1986).
Wajc, David. "Negative association: definition, properties, and applications." Manuscript, available from https://goo. gl/i2ekqM (2017). 10 pages.
Zelke, Mariano. "Weighted matching in the semi-streaming model." Algorithmica 62.1-2 (2012): 1-20. 12 pages.

\* cited by examiner

SINGLE-PASS MATCHING IN LARGE DATA STREAMS

BACKGROUND

In the context of graph theory, graphs and networks are made of nodes that are connected by edges. Graph theory has become an increasingly popular way to model real-world applications in fields such as computer science, linguistics, physics and chemistry, social sciences, biology, and mathematics, to name a few. Algorithms can be applied to such models to perform graph-based tasks such as nodes matching. Generally, matching in graph theory refers to selecting a set of disjointed edges in a graph. Graph theory matching can be used in many applications, including recommendation systems, summarization applications, Internet of Things applications, online advertising, social networks, etc. For example, a freelancing platform can be modeled as a graph with freelancer nodes and job nodes. Freelancer qualifications and job requirements can be modeled as edges between nodes for freelances and jobs the freelancers qualify for, and matching can be used to recommend available freelancers with available jobs.

However, real-world graphs involve billions of nodes and edges. As a result, storing these graphs often requires substantial storage space, and operating on them requires substantial computational time and resources. This is especially true for streaming applications where data is continually being produced and streamed.

SUMMARY

Embodiments of the present invention are directed to a single-pass matching system to efficiently and accurately determine an increased matching for large graphs representing an input data stream. In this regard, an input graph may be accessed. The input graph may represent a data stream with a plurality of data objects. In this regard, the input graph includes nodes representative of the data objects to be matched, and the nodes may be divided into first nodes and second nodes based on a first category and a second category. The input graph may also include edges connecting related nodes of the first and the second nodes. Assuming that the edges in the graph arrive in random order, a random subset of the edges may be selected to generate an initial matching. A number of matched edges connecting pairs of matched nodes may be increased by leveraging an initial matching including a selection of initial matched edges from the random subset of edges to ultimately generate an increased matching for the entirety of the input graph.

In this regard, a set of alternating paths comprising sets of adjacent edges may be generated. A set of adjacent edges for an alternating path may be selected alternatively from the unmatched edges of remaining edges not included in the random subset of edges and the initial matched edges of the random subset of edges. In some examples, each alternating path may start and end with an unmatched edge. The matched edges may be generated as an increased matching in the input graph by removing the initial matched edges from the alternating paths and selecting the remaining edges from the alternating path. The increased matching including an increased number of matched edges matching an increased number of nodes as compared to the initial matching. A graph-based task may then be triggered based on the increased matching. A graph-based task may, in some examples, include presenting a pair of matched nodes (i.e., data objects) such as advising a user of the increased matching system.

As such, an increased matching may be generated by leveraging an initial solution for a small number of edges to expand to a large graph using a single-pass algorithm. This enables the system to generate a matching for a large data stream using limited memory without compromising accuracy of the matching.

BRIEF DESCRIPTION OF THE DRAWINGS

The present invention is described in detail below with reference to the attached drawing figures, wherein.

DETAILED DESCRIPTION

Overview

Figure 1:
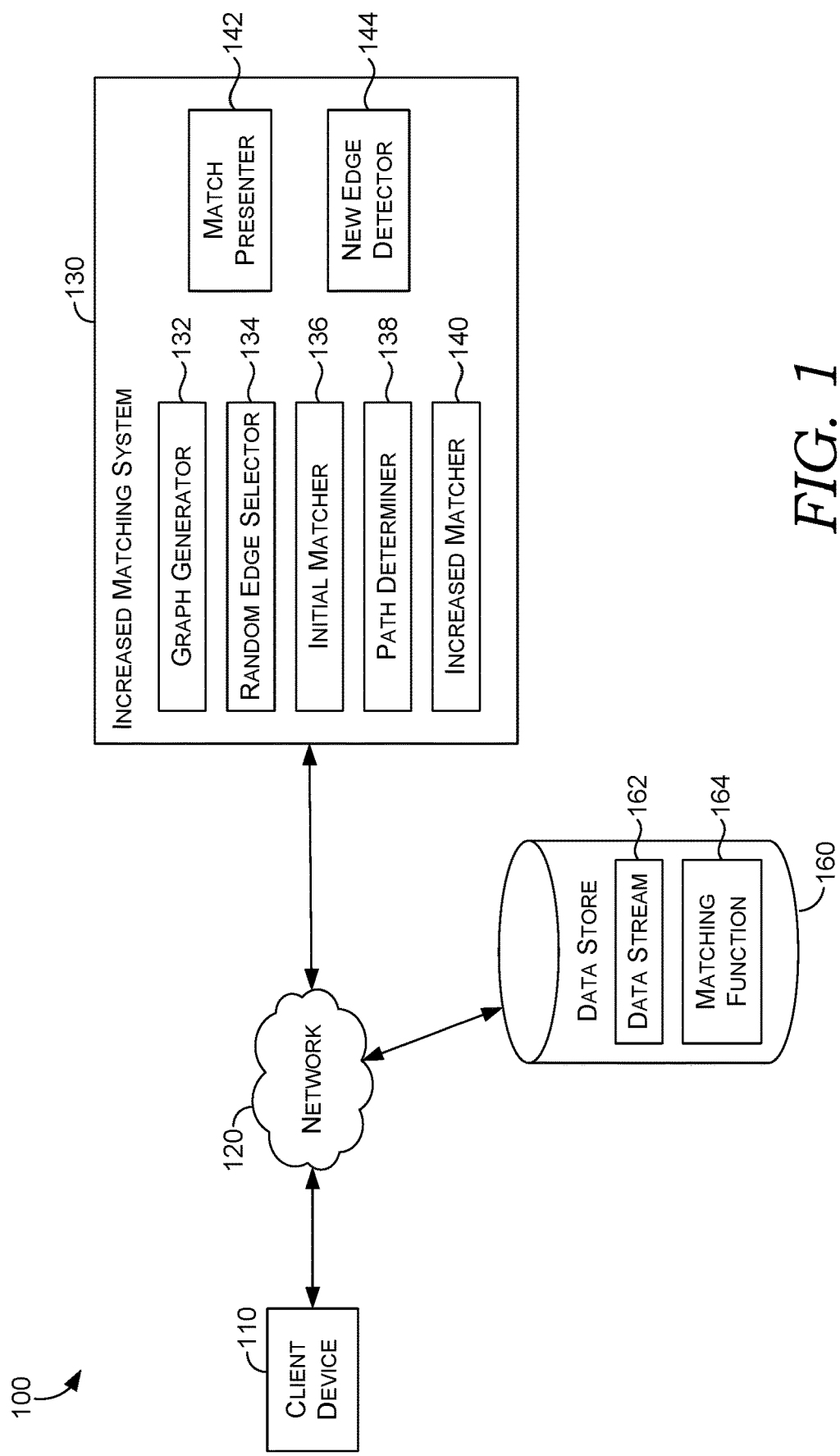
FIG. 1 is a block diagram of an exemplary environment suitable for use in implementing embodiments of the invention, in accordance with embodiments of the present invention.

With the increasing use of technology by users around the world, data mining has become a popular tool for personalizing information distributed to users. For example, online advertisement distributors employ user data, mined or collected over time, to present specific advertisements, in specific locations in a user interface. Matching algorithms are often used to solve real world problems requiring pairing one set of entities with another set of entities. For example, matching can be used by recommendation systems, matchmaking systems, placement programs, etc. Specifically, matching is used in situations that require pairing of nodes (e.g., vertices) in an input graph, where the graph represents a data stream in the form of vertices. In one example, matching is used for real-time advertisement allocations, where an advertisement from each advertiser is to be shown only once and each advertiser prefers to show the corresponding advertisement in some specific position on a webpage. In such an example, a matching can determine when and where an advertisement should be shown to receive best results. In another example, matching is used by an Internet of Things (IoT) system to match low power devices with high power devices so that a low power device can optimally send data to a matched high power device for processing. Further, matching can also be used by an IoT system to find and heal coverage holes such that a network can recover from faults by rerouting data to particular systems for optimal processing.

For a pairing problem, a data stream is generally represented in a bipartite graph, such that two sets of nodes are distinguished based on attributes of the nodes, and a set of edges connecting related nodes between the two sets represent relationships between the connected nodes. A variety of real world problems can be formed as bipartite matching problems, where matching is a set of vertex-disjoint edges of the bipartite graph. The matched edges may be used to pair nodes in data streams to increase a number of matched nodes in the stream. For example, a matching for a dating site may be used to match men and women.

Large graphs are often required to represent large data streams. However, a large computing memory is required to store the large graph with a large number of nodes. Often, computing machines lack a memory great enough to store and process the large graph. This is especially problematic when data is generated over time in the streams, and more nodes are added to the graph, requiring a new matching to be performed at each iteration. Conventional matching systems assume that the computing system has enough memory to store all of the nodes and edges of a graph and process a matching. Some conventional systems simply add edges to an initial matching in a greedy manner as new edges arrive in the data set. These systems make one locally optimal choice for each new edge to produce and refine a matching at every iteration. However, the memory required to process all edges already in the set and newly arriving edges is still considerably higher than typical computing systems are able to handle.

For example, one conventional technique for generating maximal matching in large graphs includes a greedy matching algorithm that adds edges to a matching in a greedy manner. Essentially, each edge of a graph is analyzed in a random order and an edge is added to matched edges if inclusion of the edge does not destroy the matching. The greedy algorithm makes one locally optimal choice at each iteration, to find matched edges. However, the greedy algorithm is biased towards high-degree nodes in a graph. As new edges arrive, the greedy matching algorithm decides whether the new edge fits into the current matching without destroying the one-to-one matching of nodes in the matching. However, this often leads to poor quality matches in a large graph. While the greedy matching algorithm determines a matching in a graph in one pass, it often leads to less than optimal matches, as at each iteration the matching is fixed, without taking into consideration an entirety of the graph.

Another conventional technique solves this problem of the greedy matching algorithm by taking into account an entire graph before generating a matching. However, this conventional technique requires the matching system to perform a new complete matching at each iteration of a new edge detected. This leads to the system requiring a large memory to store the graph and is computationally expensive to perform a new full matching at each iteration. For example, conventional systems using this technique require a memory that is directly proportional to a square of the size of the nodes in the input graph. This can be particularly problematic for dynamic streams where new edges are constantly being added to the graph. The memory required for this conventional technique is often much larger than the memory constraint of typical computing systems.

Accordingly, embodiments of the present invention address the technical problem of generating an increased matching for a large graph using a single-pass algorithm and limited memory without compromising quality and accuracy of the matching. Embodiments are directed to a single-pass matching system that learns an increased matching of an input graph. An increased matching for an input graph is a matching, of an increased size (e.g., increased number of matched edges), such that no two edges share a common endpoint (e.g., vertex, node). In embodiments, an increased matching system applies an algorithm to the graph that may be used to generate an increased matching for a large graph by leveraging an initial matching for a small fraction of random edges of the graph. The present system may be trained to recognize and leverage randomness inherent in a data stream to generate an approximation of a maximum matching for a given data stream represented as a graph. In contrast to conventional systems that process each edge in the entirety of an input graph to generate a matching, the present system predicts increased matching based on a random subset of edges from the input graph, leveraging the randomness inherent in data streams. The present system thus allows for a more efficient manner of generating an increased matching within large graphs that can then be used to informatively and accurately perform graph-based tasks based on maximally or increasingly matched disjoint-nodes in a graph.

Generally, the increased matching system may support the generation of increased matching for various types of input graphs, including general graphs and bipartite graphs with or without directionality, weights, attributes or labels. In some examples, the input graphs may represent a data stream received or obtained from various types of applications or platforms, including streaming videos, recommendation applications, advertising platforms, freelancing platforms, Internet of Things (IoT) platforms, etc. An input graph may be generated based on attributes of data objects in the data stream. In some examples, each data object of the data stream may be represented in the input graph as a node. Edges may be added to the input graph based on relationships between the respective related nodes. The input graph may be a general graph with nodes and edges, or a bipartite graph with two sets of nodes divided into categories based on the attributes associated with the nodes. The edges in the bipartite graph may connect related nodes of the two sets of nodes. Increased matching may include an increased number of matched edges (e.g., more than a number of matched edges in an initial matching) connecting matched nodes of the input graph, such that no two matched edges include a common node.

In some examples, for any bipartite graph received or obtained as an input graph, the nodes of the graph may include first nodes of a first category and second nodes of a second category. A bipartite graph can be represented as G=(U, V, E) where U and V are independent and disjoint sets for corresponding first nodes and second nodes, respectively, and E denotes edges of the graph. A data stream may be represented as a bipartite graph based on categories associated with each data point in the data stream. For example, for a data stream for a recommendation system, the first category may be items for recommendation, and the second category may be users. The data points may be represented as nodes. Edges may be included in the graph based on attributes of the related nodes of the first nodes and the second nodes. In the recommendation system example, an edge may be added to the bipartite graph between a user with attributes including related items viewed or purchased, age, gender, etc. and an item based on similar or complementing attributes found for the item. In some examples, weights may be associated with the edges based on similarity or correlation scores comparing to what extent the two nodes have related attributes.

A random subset of edges may be selected to perform an initial matching for the bipartite graph. In this way, the present system leverages the inherent randomness associated with the order or receipt of edges in the data stream. In some examples, a number of edges in the random subset of edges is selected based on a total number of edges in bipartite graph and a total number of nodes in the graph (e.g., first nodes and second nodes). An initial matching may be generated for the random subset of edges. The initial matching may include initial matched edges from the random subset of edges. The initial matched edges may be disjoint edges, such that no two initial matched edges share a node. Any known maximal matching algorithm may be used to generate the initial matching. In some examples, a greedy matching algorithm may be used to generate the initial matching. In such examples, the greedy matching algorithm may assume a random order of edges and create a maximal matching by adding each edge at an iteration to initial matched edges as long as the edge does not include a common node with any of the previously included initial matched edges.

A set of alternating paths may then be generated corresponding to the initial matched edges. For each initial matched edge, an alternating path including a set of adjacent edges may be generated based on the initial matched edge and the remaining edges of the input graph. The remaining edges are the edges of the input bipartite graph not included in the random subset of edges. In some examples, the set of adjacent edges alternates between initial matched edges of the random subset of edges and unmatched edges of the input bipartite graph, and starts and ends with an unmatched node. A number of matched edges connecting pairs of matched nodes for the input bipartite graph is increased by removing the initial matched edges from the alternating paths and selecting as matched edges the remaining edges from the alternating paths. The matched edges may be considered an increased matching for the input bipartite graph. In this way, for every initial matched edge, the number of matched edges may be increased by one and as such, an increased number of nodes may be matched for the input bipartite graph. By leveraging the initial matching for a small number of edges to determine alternating paths, an increased matching may be performed or generated for a large graph using a single-pass algorithm and a reasonably sized memory relative to the nodes in the graph. Further, embodiments of the present technology allow for only re-determining the alternating paths when a new edge arrives without needing to reanalyze the entire graph as new edges are added. A variety of real world practical applications may utilize such increased matching, where matching is a set of vertex-disjoint edges of the bipartite graph.

A graph-based task may be triggered based on the increased matching. The graph-based task may include presenting to a client device a representation of a matched node based on the increased matching. For example, one practical application may be for video summarization. In such an example, the input bipartite graph may represent a streaming video, with the first nodes including a first half of frames of the streaming video, the second nodes including a second half of the frames, and the edges representing a similarity between the related nodes of the first and second nodes. In this example, the increased matching may represent key frames forming a summary of the streaming video, and the graph-based task may include presenting to the client device the key frames as the summary of the streaming video.

In another example, another practical application may be for a recommendation system. In such an example, the input bipartite graph may represent a data stream from a recommendation application, with the first nodes including users of the recommendation application and the second nodes including items available for recommendation. The increased matching may then represent matching users with items to recommend, and the graph-based task may include presenting a matched user with a matched item based on the increased matching via a client device.

A practical application may also be for an advertising platform. Here, the input bipartite graph may represent a data stream from an advertising platform, with the first nodes including advertisements, the second nodes including positions available for advertisements on the advertising platform, and the edges representing a preference of advertisers to place advertisements at positions. The increased matching may then represent a matching between advertisements and positions for presentation of the advertisements within the advertising platform, and the graph-based task may include presenting a matched advertisement at a matched position within the advertising platform via a client device based on the increased matching.

Another practical application may also be for a freelancing platform. In this application, the input bipartite graph may represent a data stream of a freelancing platform, with the first nodes including freelancers, the second nodes including clients requiring freelancers, and the edges representing a relationship between freelancer qualifications and job description attributes. The increased matching may then represent a matching between freelancers and clients for job positions, and the graph-based task includes presenting a matched freelancer to a matched client for a job position via a client device based on the increased matching.

Further, a practical application may be for an IoT platform. Here, the input bipartite graph may represent an IoT network of devices, with the first nodes including low power devices and the second nodes including high power devices in the IoT network, and the edges representing a potential, existing and/or previous connections between the low power devices and the high power devices. As such, the increased matching may represent a matching between low power devices and high power devices such that a matched low power device may optimally send data for analysis or processing to a corresponding matched high power device when the analysis or processing requires more power than the matched low power device has available. The graph-based task may then include sending data from the matched low power device to the matched high power device in response to detecting low power in the matched low power device.

While specific practical applications are presented herein to describe the process, it should be understood that this is for example purposes only, and the increased matching described herein may be used by any other applications or data streaming platforms that may benefit from matching pairs of data points or nodes, such as but not limited to, linguistics platforms, social networking platforms, etc.

In another embodiment, the present system may take as input a general graph and generate an increased matching for the general graph by leveraging an arbitrary bipartite matching algorithm. A general graph is generally used by various real-world applications to model pairwise relations between data objects. The input general graph may represent a data stream generated for an application or platform. The input general graph may include nodes to be matched and edges connecting related nodes of the input graph. The edges may represent relationships between the connected nodes. The general graph, G, can be represented as an ordered pair as follows:

$$G=(U,E)$$

where U is a set of nodes in graph G, and E denotes a set of edges of the general graph G. The nodes and/or edges of the general graph may have attributes (e.g., categorical, real-valued, etc.). The input general graph may represent a data stream for various types of relations and processes in physical, biological and information systems. Several practical problems may be represented by general graphs, including networks of communications, data organization, computational devices, flow of computation, natural language systems, atomic structures, electronic networks, social networks, collaborative systems, etc.

A random subset of edges of the input general graph may be selected to generate an initial matching for the input general graph. The edges for the random subset of edges may be randomly selected from the set of edges in the input general graph. In this way, the present system leverages the inherent randomness associated with the order or receipt of edges in the data stream. In some examples, a number of edges in the random subset of edges is selected based on a total number of edges in the general graph and a total number of nodes in the general graph (e.g., the set of nodes). An initial matching may be generated for the random subset of edges. The initial matching may include initial matched edges from the random subset of edges. The initial matched edges may be disjoint edges, such that no two initial matched edges share a node. Any known maximal matching algorithm may be used to generate the initial matching. In some examples, a greedy matching algorithm may be used to generate the initial matching. In such examples, the greedy matching algorithm may assume a random order of edges and create a maximal matching by adding each edge at an iteration to initial matched edges as long as the edge does not include a common node with any of the previously included initial matched edges.

Based on the initial matching, a bipartite graph may be generated based on the initial matched nodes forming the initial matched edges and nodes associated with remaining edges of the input graph not included in the random subset of edges. In this way, the generated bipartite graph, G', may be represented as:

$$G'=(V(M_0),\overline{V(M_0)})$$

where $M_0$ denotes the initial matching, $V(M_0)$ denotes nodes (e.g., vertices) in the initial matching, and $\overline{V(M_0)}$ denotes nodes not in the initial matching. An edge of the input general graph may be included in the bipartite graph, G', if exactly one node of the edge is a node from the initial matching, $V(M_0)$. In other words, the edges in the bipartite graph are a second subset of edges selected from the edges of the input general graph that connect associated ones of first nodes associated with initial matched edges and second nodes associated with the remaining edges.

A number of matched edges connecting pairs of matched nodes for the input general graph is increased using a bipartite matching algorithm to find or generate a maximal or increased matching for the second subset of edges. Any known maximal matching algorithm for bipartite graphs may be used to generate an increased matching for the generated bipartite graph, G'. Any known maximal matching algorithm that is capable of generating a matching in the generated bipartite graph, G', and can select a set of matched edges chosen such that no two matched edges share a common matched node, and such that adding another edge to the matching destroys the matching including disjoint edges. In some examples, a greedy matching algorithm may be used to generate the maximal matching for the generated bipartite graph, G'. In such examples, the greedy matching algorithm may assume a random order of edges and create a matching by adding each edge of the second subset of edges at an iteration to matched edges as long as the edge does not include a common node with any of the previously included matched edges. In some other examples, the increased matching algorithm described above with respect to the input bipartite graph may be used to generate a matching for the generated bipartite graph, G'. The matching for the generated bipartite graph, G', may be determined to be the increased matching for the input general graph. The matched edges may include disjoint edges selected from second subset of edges such that no two matched edges share a matched node.

In this way, by leveraging the initial matching for a small number of edges to generate a bipartite graph, an increased matching may be performed or generated for a large general graph using a single-pass algorithm that reduces an arbitrary bipartite matching algorithm to find an increased matching in a general graph using a reasonable memory to store and process nodes and edges of the input general graph. A variety of real world practical applications may utilize such increased matching, where matching is a set of vertex-disjoint edges of the general graph.

A graph-based task may be triggered based on the increased matching. The graph-based task may include presenting to a client device a representation of a matched node based on the increased matching. For example, one practical application may be for video summarization. In such an example, the input general graph may represent a streaming video, with the nodes including frames of the streaming video, and the edges representing a similarity between the related frames of the video. In this example, the increased matching may represent key frames forming a summary of the streaming video, and the graph-based task may include presenting to the client device the key frames as the summary of the streaming video. Other such real-world applications that can benefit from pairwise matching of data objects (e.g., data points) may also be represented using general graphs and solved using the single-pass matching algorithm described herein.

Aspects of the technology disclosed herein provide a number of advantages over previous solutions. For instance, one previous approach involves generating maximal matching using a greedy matching algorithm that adds edges to a matching in a greedy manner. However, that approach is biased towards high-degree nodes in a graph, which often leads to poor quality matches in a large graph. While the greedy matching algorithm determines or generates a matching in a graph in one pass, it often leads to less than optimal matches as at each iteration, the matching is fixed, without taking into consideration an entirety of the graph. Another previous approach involves taking into account an entire graph before generating a matching. However, this approach requires the matching system to perform a new complete matching at each iteration of a new edge detected, leading to the system requiring a large memory (i.e., memory that grows in direct proportion to a square of the size of the nodes in the input graph) to store the graph and is computationally expensive to perform a new full matching at each iteration. This can be particularly problematic for dynamic streams where new edges are constantly being added to the graph.

To avoid such constraints on the present system, embodiments of the technology described herein, for instance, systematically employ an algorithm(s) to recognize and utilize randomness inherent in the arrival of edges in a data stream to generate an increased matching for a large graph, which is closer to a maximum matching compared to conventional techniques, in a single-pass and using a limited memory. Unlike the conventional systems, the embodiments of the present technology only use a memory that grows linearly and in direct proportion to the size of the nodes in the input graph to store and process the input graph. Embodiments of the present technology may allow for a more efficient manner of generating an increased matching within large graphs that can then be used to informatively and accurately perform graph-based tasks based on an increased number of matched disjoint-nodes in a graph within the memory constraints of present computing systems.

Having briefly described an overview of aspects of the present invention, various terms used throughout this description are provided. Although more details regarding various terms are provided throughout this description, general descriptions of some terms are included below to provider a clearer understanding of the ideas disclosed herein:

Graphs—In the context of graph theory, graphs are made of nodes that are connected by edges. Nodes and/or edges can have attributes (e.g., categorical, real-valued, etc.). Although some embodiments are described with respect to graphs, the techniques described herein can apply equally to graphs and networks. For example, some embodiments are described as being generalized for certain types of graphs, but variations may be implemented for any type of graph (e.g., general graphs, bipartite graphs, with or without weights, with or without attributes, etc.).

General Graphs—A general graph may be a graph that represents a data stream generated for an application or platform. Data objects of the data stream are represented as nodes of the general graph. A general graph may include nodes and edges connecting related nodes. The edges may represent relationships between the connected nodes. A general graph can be represented as $G=(U, E)$ with U as the node set and E as the edge set ($|U|=n$, $|E|=m$). The input general graph may represent a data stream for various types of relations and processes in physical, biological and information systems.

Bipartite Graphs—A bipartite graph may be a graph that represents a data stream generated for an application or platform. Data objects of the data stream may be represented as nodes in the bipartite graph. A bipartite graph is a graph whose nodes (e.g., vertices) can be divided into two disjoint and independent sets of nodes such that the nodes are divided into two distinct categories based on the attributes associated with the nodes. The edges in the bipartite graph may connect related nodes of the two sets of nodes. A bipartite graph can be represented as $G=(U, V, E)$ where U and V are two independent and disjoint of nodes, and E denotes is the edges set of the graph. Edges may be included in the graph based on attributes of the related nodes of the first nodes and the second nodes.

Matching—Matching in graph theory is a set of matched edges selected from a graph such that no two selected edges in the matching share the same node (e.g., vertex). Matching of a graph is a subgraph where each node of the subgraph has either zero or one edge incident to it. Matching can further be described as pairs of matched nodes forming a set of matched edges, where each node of the pairs of nodes has either zero or one edge incident to it.

Maximum Matching—A maximum matching in graph theory is a matching with as many edges (e.g., largest possible number of edges) included as possible. Specifically, a maximum matching is a set of matched edges from a graph such that adding another edge to the matching destroys the matching. In this regard, a maximum matching includes a maximum set of node-disjoint edges as possible in a graph. Maximum matching of a graph is a subgraph where each node of the subgraph has either zero or one edge incident to it, and the number of edges in the set of matched edges is a maximum number of disjoint edges possible for a graph.

Maximal Matching—Maximal matching is a matching with a set of node-disjoint edges such that adding another edge to the matching destroys the matching. A maximal matching does not necessarily include a maximum number of edges than can potentially be matched in a graph. In this regard, a maximum matching is always a maximal matching; however, a maximum matching is not always a maximal matching.

Increased Matching—Increased matching is a matching in an input graph with a larger number of node-disjoint edges than an initial matching. The initial matching is a maximal matching for a random subset of edges of an input graph. The initial matching includes initial matched edges that are a subset of the random subset of edges determined busing a maximal matching algorithm. An increased matching leverages random arrival of edges in the data stream to expand an initial matching for a random subset of edges of a graph to the entirety of the bipartite graph. As such, the increased matching is a matching with a set of node-disjoint edges that is larger than initial matched edges of the initial matching by at least a value of one for each initial matched edge in the initial matching.

Greedy Matching Algorithm—Greedy matching algorithm in graph theory is a greedy algorithm that generates a potential maximal matching for an input graph in a greedy manner (i.e., making a locally optimal choice at each stage or edge as it is added to a graph without considering remaining edges in the graph). A greedy matching algorithm may assume a random order of edges and create a matching for a graph by adding each edge of the graph at an iteration to the matching as long as the edge does not include a common node with any of the previously included matched edges. In this way, the greedy matching algorithm starts with an empty matching and adds edges to the matching in a random order as each new edge is considered. The greedy matching algorithm is a maximal matching algorithm that may make decisions based on the edges added to the matching so far, but does not consider future choices or remaining edges in the graph when making decisions at each iteration.

Bipartite Matching Algorithm—A bipartite matching algorithm is a matching algorithm used to determine an increased or a maximal matching for a bipartite graph. Any known matching algorithm capable of determining an increased or maximal matching for bipartite graph may be a bipartite matching algorithm, with respect to the technology described herein. In some examples, a bipartite matching algorithm may be a greedy matching algorithm.

Single-Pass Matching Environment

Referring now to FIG. 1, a block diagram of exemplary environment 100 suitable for use in implementing embodiments of the present invention is shown. Generally, single-pass matching system 100 is suitable for facilitating increased matching for graphs using a single-pass algorithm, and among other things, facilitates generation of an increased matching for a graph by leveraging an initial matching for a small, random subset of edges of the graph to trigger graph-based tasks based on the matching.

The single-pass matching system 100 includes a network 120, a client device 110, data store 160, and an increased matching system 130. The client device 110 can be any kind of computing device capable of facilitating increased matching for graphs. For example, in embodiments, client device 110 can be a computing device such as computing device 800, as described below with reference to FIG. 8. In embodiments, client device 110 can be a personal computer (PC), a laptop computer, a workstation, a mobile computing device, a PDA, a cell phone, or the like. The components of the single-pass matching system 100 may communicate with each other via network 120, which may include, without limitation, one or more local area networks (LANs) and/or wide area networks (WANs). Such networking environments are commonplace in offices, enterprise-wide computer networks, intranets, and the Internet.

Client device 110 can include various applications. An application may generally be any application capable of facilitating a graph-based task based on a matching, and may be a stand-alone application, a mobile application, a web application, or the like. In some implementations, the application comprises a web application, which can run in a web browser, and could be hosted at least partially server-side. In addition, or instead, the application can comprise a dedicated application. In some cases, the application can be integrated into the operating system (e.g., as a service). Although generally discussed herein as the client device 110 may include an application for performing graph-based tasks, in some cases, the functionality required to perform graph-based tasks, or a portion thereof, can be additionally or alternatively integrated into the operating system (e.g., as a service) or a server (e.g., a remote server). In some examples, the application(s) may be stored in a cloud computing environment.

The client device 110 may include a user interface or application allowing the user to perform various graph-based tasks, and/or stream data. Any suitable user interface and input component may be used, such as those described with respect to I/O components 820 of FIG. 8. Various types of data stream may be received for matching. For example, the client device 110 may stream videos, stream data via recommendation applications, stream data via advertising platforms, stream data relating to Internet of Things (IoT) platforms, stream data via freelancing platforms, etc. Generally, the client device 110 is in communication with the increased matching system 130 via network 120, and may send the data stream from the client device 110 to the increased matching system 130 for processing. A multitude of client devices may send data to the increased matching system 130 for processing. The data from the client devices may together be considered a data stream for processing. Although the data stream is described as being sent to the increased matching system 130, this need not be the case, as any or all of the components of the increased matching system 130 may be located on the client device 110 or elsewhere.

The data store 160 stores data streams, corresponding graphs, and corresponding increased matching functions. The data store 160 may include a data stream 162 and a matching function 164. In some examples, the data store 160 may include a repository of data streams stored associated various applications and platforms in accordance with a time stamp corresponding to the latest version of the data stream, and the latest matching function or matching for the data stream. The data stream 162 can store data streams from one or more applications. The data streams may be associated with the corresponding application. For a dynamic data stream, the data stream 162 may update the corresponding stored data stream when new edges arrive. The data stream 162 may store a data stream including data objects in the data stream, and the relationships between the data objects. In some examples, the data stream 162 may also store general and/or bipartite graphs for each data stream in data store 160. The data stream 162 may receive or obtain the data streams from the client device 110, or a combination of client devices. The received or obtained data stream may include data objects and their corresponding relationships. The data stream 162 may receive or obtain general graphs or bipartite graphs associated with data streams from the increased matching system 130 or the graph general 132 of the increased matching system 130. The data stream 162 may store the graphs in associated with the corresponding data streams.

The matching function 164 may store increased matching functions in association with the data streams in data stream 162. An increased matching function for a data stream in the matching function 164 may be updated periodically when new edges arrive in the data stream. The matching function 164 may receive or obtain the increased matching functions from the increased matcher 140 of the increased matching system 130.

Generally, the forgoing process can facilitate determination and presentation of an increased matching for a graph associated with a data stream in response to receiving a data stream with data objects and their corresponding relationships for matching by using a single-pass algorithm to generate an increased matching in a bipartite graph that leverages random arrival of edges in the data stream to expand an initial matching for a random subset of edges of a graph to the entirety of the bipartite graph. By adopting such algorithms of the present disclosure to determine matched edges including pairs of matched nodes, an increased matching for a large graph representing a data stream may be determined in a single-pass and using a limited memory.

The increased matching system 130 is generally configured to receive a data stream and generate an increased matching of data objects of the data stream. The increased matching system 130 may receive the data stream from the client device 110. In some examples, the increased matching system 130 may be a part of the client device 110. In other examples, the increased matching system 130 may be located on a remote server, such that client device 110 may communicate with the increased matching system 130 via network 120. In some examples, the graph generator 132 may receive a data stream from the data store 160. In the embodiments illustrated in FIG. 1, the increased matching system 130 includes a graph generator 132, a random edge selector 134, an initial matcher 136, a path determiner 138, an increased matcher 140, a match presenter 142, and a new edge detector 144.

The increased matching system 130 is generally configured to generate an increased matching for bipartite graphs representing a data stream. Specifically, the increased matching system 130 may generate a bipartite graph to represent a data stream by dividing data objects of the data stream into two distinct sets of nodes with corresponding two categories. System 130 generates an initial matching for a random subset of edges of the bipartite graph and leverages it to determine or generate an increased matching including matched edges connecting pairs of matched nodes for the entirety of the bipartite graph using alternating paths generated based on the initial matching. The increased matching system 130 may use the increased matching to trigger graph-based tasks, such as presenting information to the client device 110 based on the increased matching.

The graph generator 132 may retrieve or obtain a data stream representing data objects of an application (e.g., recommendation system, IoT platform, advertising platform, video streaming application, etc.) from the client device 110 or a collection of client devices. In some examples, the graph generator 132 may receive the data stream from the data store 160. Upon obtaining the data stream, the graph generator 132 may generate an input graph representing the data stream. The input graph may include a plurality of nodes and a plurality of edges connecting the nodes. The data objects of the data stream may be represented as nodes, and the relationships between the data objects may be represented as edges.

The graph generator 132 may generate the input graph based on attributes of the data objects in the data stream. In some examples, each data object of the data stream may be represented in the input graph as a node. Edges may be added to the input graph based on relationships between the respective related nodes. The graph generator 132 may generate an input graph as a general graph with nodes and edges, or a bipartite graph with two sets of nodes divided into categories based on the attributes associated with the nodes. The edges in the bipartite graph may connect related nodes of the two sets of nodes.

In embodiments, the graph generator 132 may generate a bipartite graph as the input graph. Here, the graph generator 132 may divide the nodes of the graph into two distinct sets of nodes, namely first nodes of a first category and second nodes of a second category. The input bipartite graph can be represented as $$G=(U,V,E)$$

where U and V are independent and disjoint sets for corresponding first nodes and second nodes, respectively, and E denotes edges of the graph. The graph generator 132 may represent the data stream as a bipartite graph based on categories associated with each data object in the data stream. For example, for a data stream for a recommendation system, first category may be items for recommendation, and the second category may be users. The data object (i.e., items and users) may be represented as nodes. A plurality of edges may be included in the graph based on attributes of the related nodes of the first nodes and the second nodes. In the recommendation system example, an edge may be added to the bipartite graph between a user with attributes including related items viewed or bought, age, gender, etc. and an item based on similar or complementing attributes found for the item. In some examples, the graph generator may associate weights with the edges based on similarity or correlation scores comparing to what extent the two nodes have related attributes.

The random edge selector 134 may be configured to select a random subset of edges from the plurality of edges of the input graph. The random edge selector 134 may receive or obtain the input graph from the graph generator 132. The random edge selector 134 may select the random subset of edges to perform an initial matching for the bipartite graph. In some examples, the random edge selector 132 may assume that the plurality of edges of the input graph has an inherent randomness. In other words, the random edge selector 134 may assume that the edges in the input graph arrive in random order. The edges for the random subset of edges may randomly selected. In this way, the increased matching system 130 leverages the inherent randomness associated with the order or receipt of edges in the data stream. In some examples, a number of edges in the random subset of edges is selected based on a total number of edges in bipartite graph and a total number of nodes in the graph (e.g., first nodes and second nodes). In an example, the number of edges, $E_0$, in the random subset of edges may be determined by:

$$E_0 = \frac{m}{\log n}$$

where m denotes a total number of edges in the input graph, and n denotes the total number of nodes in the input graph. In this way, the random subset of edges include a small fraction of total edges in the input graph.

The initial matcher 136 may generally be configured to determine or generate an initial matching for the random subset of edges. The initial matching may include initial matched edges selected from the random subset of edges, such that no two edges in the initial matched edges share a node. The initial matcher 136 may receive or obtain the random subset of edges from the random edge selector 134. The initial matcher 136 may determine or generate the initial matched edges as a maximal matching for the random subset of edges such that the initial matched edges are disjoint edges, no two initial matched edges share a node, and adding another edge from the random subset of edges to the initial matched edges destroys the matching. In the way, the initial matcher 136 may determine a maximal matching for the random subset of edges. The initial matcher 136 may utilize any known maximal matching algorithm to determine or generate the initial matching. In some examples, the initial matcher 136 may use a greedy matching algorithm to determine or generate the initial matching. In such examples, the greedy matching algorithm may assume a random order of edges and create a maximal matching by adding each edge at an iteration to initial matched edges as long as the edge does not include a common node with any of the previously included initial matched edges. The initial matched edges may connect pairs of initial matched nodes. The initial matcher 136 may determine or generate the initial matching to maximize the number of nodes in the random subset of edges included in the matched nodes.

The path determiner 138 may be configured to determine or generate alternating paths for the input graph based on the initial matched edges and the remaining edges of the input graph. The path determiner 138 may obtain the initial matched edges from the initial matcher 136 and the remaining edges from the graph generator 132. The path determiner 138 may determine or generate a set of alternating paths corresponding to the initial matched edges. For each initial matched edge, an alternating path may include a set of adjacent edges determined based on the initial matched edge and the remaining edges of the input graph. The remaining edges are the edges of the input bipartite graph not included in the random subset of edges. In examples where random edges includes $E_0$ random subset of edges, the remaining edges, $E_r$, may be represented as follows:

$$E_r = \left(1 - \frac{m}{\log n}\right)$$

where m is the total number of edges in the input graph and n denotes the total number of nodes (e.g., first nodes and second nodes) in the input graph. In some examples, the path determiner 138 may determine a set of adjacent edges corresponding an initial matched edge as adjacent edges in the input graph that alternate between the unmatched edges of the remaining edges of the input graph and the initial matched edge of the random subset of edges, and starts and ends with an unmatched node.

The increased matcher 140 may generally be configured to determine or generate an increased matching including an increased number of matched edges connecting pairs of matched nodes for the input graph. The increased matcher 140 may increase a number of matched edges connecting pairs of matched nodes for the input graph by removing the initial matched edges from the alternating paths and selecting as matched edges the remaining edges from the alternating paths. The matched edges may connect pairs of matched nodes, a pair including one node each from the first nodes and the second nodes of the input graph. The matched edges may be considered an increased matching for the input graph. In this way, for every initial matched edge, the increased matcher 140 may increase the number of matched edges by one and as such, matches an increased number of nodes for the input graph. The increased matching may be represented as pairs of matched nodes in the input graph. In some examples, the increased matching may be represented as a subgraph including the pairs of matched nodes and the matched edges. By leveraging the initial matching for a small number of edges to determine alternating paths, an increased matching may be performed by the increased matching system 130 for a large graph using a single-pass algorithm and a reasonable memory equal to the nodes in the graph.

Next, the match presenter 142 may generally be configured to trigger graph-based tasks based on the increased matching. The match presenter 142 may receive or obtain the increased matching from the increased matcher 140. The match presenter 142 may use the pairs of matched nodes in the increased matching to trigger a variety of graph-based tasks. A variety of real world practical applications may utilize such increased matching, where matching is a set of vertex-disjoint edges of the input graph. The graph-based task may include presenting to a client device a representation of a matched node based on the increased matching. For examples, some practical applications that can be represented as bipartite graphs and consequently benefit from performing graph-based tasks based on the increased matching may include video summarization, recommendation applications, advertising platforms, freelancing platforms, IoT platforms, etc. Some specific examples of graph-based tasks that may be triggered based on increased matching are described in detail herein with respect to description of the overview of the application above. While specific practical applications are presented herein to describe the process, it should be understood that this is for example purposes only, and the increased matching described herein may be used by any other applications or data streaming platforms that may benefit from matching pairs of data points or nodes, such as but not limited to, linguistics platforms, social networking platforms, etc. Further, alternative graph-based tasks are also anticipated that may correspond to other ways of utilizing an increased matching for graphs representing data streams.

In some examples, a new edge detector 144 may also be utilized in the increased matching system 130. The new edge detector 144 may generally be configured to detecting when a new edge arrives in the data stream, and ultimately in the input graph. The new edge detector 144 may receive new data object(s) and corresponding relationship(s) from the client device 110. In some example, the new edge detector 144 may receive new data object(s) and corresponding relationship(s) from the data store 160. The new edge(s) may be received for a semi-stream data stream that receives new data object(s) at every iteration. The new edge detector 144, in some examples, may compare the original data stream with a new data stream at every iteration to determine when one or more new data objects arrive in the data stream. Upon detection of the new data object(s), the new edge detector 144 may add the new data object(s) as node(s) and the new corresponding relationship(s) as new edge(s) to the input graph. In some examples, the new edge detector 144 may add the new edge(s) to the remaining edges of the input graph. The new edge detector 144 may send the new edge(s) to the path determiner 138 to re-determine the alternating paths based on the addition of the new edge(s) to the remaining edges. The re-determined alternating paths may then be used to determine an updated increased matching by the increased matcher 140. As such, new edges may be used efficiently to update the increased matching for the input graph at every iteration when a new edge arrives in the input graph without having to analyze the entire input graph again and perform the increased matching algorithm again in its entirety every time a new edge arrives or is detected.

In this way, a variety of real-world problems requiring matching pairs of data objects in a data stream may be solved using an increased matching algorithm that accurately and efficiently determines an approximation of a maximum matching in a single-pass and using limited memory.

Figure 2:
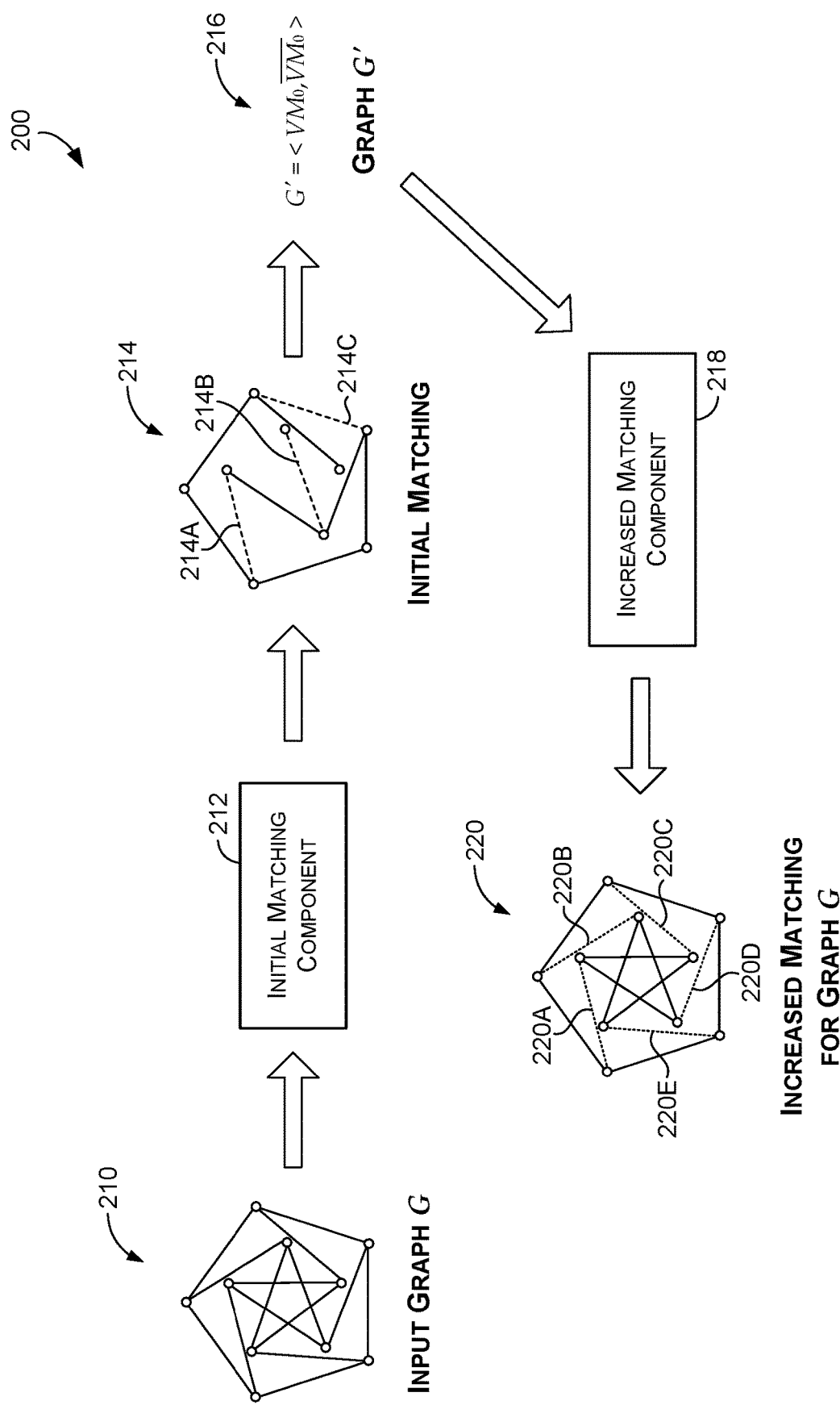
FIG. 2 is a data flow diagram illustrating an example process for determining an increased matching for a general graph, in accordance with embodiments of the present invention.

Now referring to FIG. 2, FIG. 2 is an example data flow diagram illustrating an example process 200 for determining or generating an increased matching for a general graph, in accordance with some embodiments of the present disclosure. The process 200 may use any components of system 100 to perform the various steps described herein. In some examples, the process 200 may be used as an alternate increased matching process than that described with respect to the system 100 of FIG. 1. The process 200 may include generating and/or receiving an input graph representing a data stream from a client device or a data store, such as the client device 110 of FIG. 1 or data store 160 of FIG. 1. The process 200 may begin with receiving and/or generating an input graph, G, 210. In some examples, the process 200 may utilize the graph generator 132 to generate the input graph, G, 210. A general graph is generally used by various real-world applications to model pairwise relations between data objects. The input graph, G, 210 may be a general graph that represents a data stream generated for an application or platform. The input graph, G, 210 may include nodes to be matched and edges connecting related nodes of the input graph. The edges may represent relationships between the connected nodes. The input graph, G, can be represented as an ordered pair as follows:

$$G=(U,E)$$

where U denotes a set of nodes in graph G, and E denotes a set of edges of the general graph G. The nodes and/or edges of the input graph, G, 210 may have attributes (e.g., categorical, real-valued, etc.). The input graph, G, 210, may represent a data stream for various types of relations and processes in physical, biological and information systems. Several practical problems may be represented by general graphs, including networks of communications, data organization, computational devices, flow of computation, natural language systems, atomic structures, electronic networks, social networks, collaborative systems, etc.

An initial matching component 212 may take as input the input graph, G, 210 and generate or determine as output an initial matching 214 for a random subset of edges of the input graph, G, 210. The initial matching component may process the input graph, G, 210 in similar analyses as performed by a combination of the random edge selector 134 and the initial matcher 136 of FIG. 1. The initial matching component 212 may select a random subset of edges of set of edges, E, of the input the input graph, G to determine an initial matching for the random subset of edges. The edges for the random subset of edges may be randomly selected. In this way, the process 200 may leverage the inherent randomness associated with the order or receipt of edges in the data stream to accurately determine or generate the initial matching 214 that can then be expanded to an increased matching for the entire input graph.

In some examples, a number of edges in the random subset of edges is selected based on a total number of edges in the general graph and a total number of nodes in the general graph (e.g., the set of nodes). In an example, the number of edges, $E_0$, in the random subset of edges may be determined by:

$$E_0 = \frac{m}{\log n}$$

where m denotes a total number of edges in the input graph, and n denotes the total number of nodes in the input graph. In this way, the random subset of edges include a fraction of total edges in the input graph.

The initial matching component 212 may then generate the initial matching 214 as a maximal matching for the random subset of edges. The initial matching 214 may include initial matched edges selected from the random subset of edges, such that no two edges in the initial matched edges share a node. The initial matching component 212 may determine the initial matched edges 214A-214C as a maximal matching for the random subset of edges such that the initial matched edges are disjoint edges, no two initial matched edges share a node, and adding another edge from the random subset of edges to the initial matched edges destroys the matching. In the way, the initial matching component 212 may determine a maximal matching for the random subset of edges. The initial matching component 212 may utilize any known maximal matching algorithm to determine the initial matching 214. In some examples, the initial matching component 212 may use a greedy matching algorithm to determine the initial matching 214. In such examples, the greedy matching algorithm may assume a random order of edges and create a maximal matching by adding each edge at an iteration to initial matched edges as long as the edge does not include a common node with any of the previously included initial matched edges. The initial matched edges 214A, 214B, and 214C of the initial matching 214 may connect pairs of initial matched nodes. In some examples, the initial matching component 212 may determine the initial matching 214 to maximize the number of nodes in the random subset of edges included in the matched nodes.

Based on the initial matching, a bipartite graph, G', 216 may be generated based on the initial matched nodes forming the initial matched edges and nodes associated with remaining edges of the input graph not included in the random subset of edges. For examples, where the number of edges in the random subset of edges is represented by $E_0$, the nodes associated with the remaining edges $E_r$, may be represented as follows:

$$E_r = \left(1 - \frac{m}{\log n}\right)$$

where m is the total number of edges in the input graph and n denotes the total number of nodes in the input graph.

In this way, the generated bipartite graph, G', 216 may be represented as:

$$G'=(V(M_0),\overline{V(M_0)})$$

where $M_0$ denotes the initial matching, V ($M_0$) denotes nodes (e.g., vertices) in the initial matching, and $\overline{V(M_0)}$ denotes nodes connected by the remaining edges, $E_r$, that are not in the initial matching, $M_0$. An edge of the input general graph may be included in the bipartite graph, G', 216 if exactly one node of the edge is a node from the initial matching, V($M_0$). In other words, the edges in the bipartite graph, G', 216 may be a second subset of edges selected from the edges of the input general graph, G, that connect associated ones of first nodes, V($M_0$), associated with initial matched edges 214A-214C and second nodes, $\overline{V(M_0)}$, associated with the remaining edges, $E_r$, of the input graph, G, not included in the initial matched edges 214A-214C.

Next, an increased matching component 218 may be utilized to determine or generate an increased matching for the input graph, G, 210 based on an increased or maximal matching of the generated bipartite graph, G' 216. The increased matching algorithm 218 may increase a number of matched edges connecting pairs of matched nodes for the input graph, G, 210 using a bipartite matching algorithm to find a matching for the second subset of edges of the bipartite graph, G', 216. Any known maximal matching algorithm for bipartite graphs may be used to determine a matching for the generated bipartite graph, G', 216. Any known maximal matching algorithm that is capable of determining a matching in the generated bipartite graph, G', is an algorithm that can select a set of matched edges chosen such that no two matched edges share a common matched node, and such that adding another edge of the second subset of edges to the matching destroys the matching including disjoint edges. In some examples, the increased matching component 218 may use a greedy matching algorithm to determine or generate the maximal matching for the generated bipartite graph, G', 216. In such examples, the greedy matching algorithm may assume a random order of edges and create a maximal matching by adding each edge of the second subset of edges at an iteration to matched edges as long as the edge does not include a common node with any of the previously included matched edges. In some other examples, the increased matching algorithm described above with respect to the input bipartite graph with respect to FIG. 1 may be used to generate a matching for the generated bipartite graph, G', 216. The matching for the generated bipartite graph, G', may be determined to be the increased matching 220 for the input general graph, G, 210. The matched edges 220A-220E may include disjoint edges selected from second subset of edges such that no two matched edges share a matched node.

In this way, by leveraging the initial matching 214 for a small number of edges to generate a bipartite graph, G', 216, an increased matching 220 may be generated for a large general graph G, 210 using a single-pass algorithm that reduces an arbitrary bipartite matching algorithm to find an increased matching in a general graph using a reasonable memory to store and process nodes and edges of the input general graph. A variety of real world practical applications may utilize such increased matching, where matching is a set of vertex-disjoint edges of the general graph.

A graph-based task may be triggered based on the increased matching 220. The graph-based task may include presenting to a client device, such as the client device 120 of FIG. 1, a representation of a matched node based on the increased matching 220. For example, one practical application may be for video summarization. In such an example, the input general graph, G, 210 may represent a streaming video, with the nodes including the frames of the streaming video, and the edges representing a similarity between the related frames of the video. In this example, the increased matching 220 may represent key frames forming a summary of the streaming video, and the graph-based task may include presenting to the client device 210 the key frames as the summary of the streaming video. Other such real-world applications that can benefit from pairwise matching of data objects (e.g., data points) may also be represented using general graphs and benefit from using the increased matching algorithm described herein.

Figure 3A:
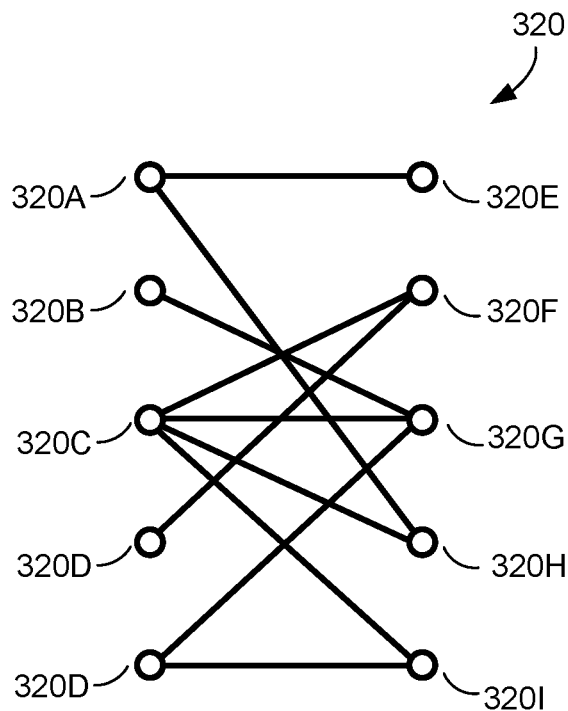
FIG. 3A illustrates an example bipartite graph, in accordance with embodiments of the present invention.

Referring now to FIGS. 3A-3D, FIGS. 3A-3D are illustrations of an example process of increased matching for a bipartite graph, in accordance with some embodiments of the present disclosure. FIG. 3A illustrates an example input bipartite graph 300 with a plurality of nodes to be matched. The input bipartite graph 320 includes nodes (320A-320I) divided into two sets of nodes, first set of nodes 320A-320D, and second set of nodes 320E-320I. The first set of nodes 320A-320D are connected to related nodes of second set of nodes 320E-320I by a plurality of edges. For example, first node 320A is connected to related second node 320E, and related second node 320H via an edge. Similarly, first node 320 is connected to related second node 320G via another edge, and so on.

Figure 3B:
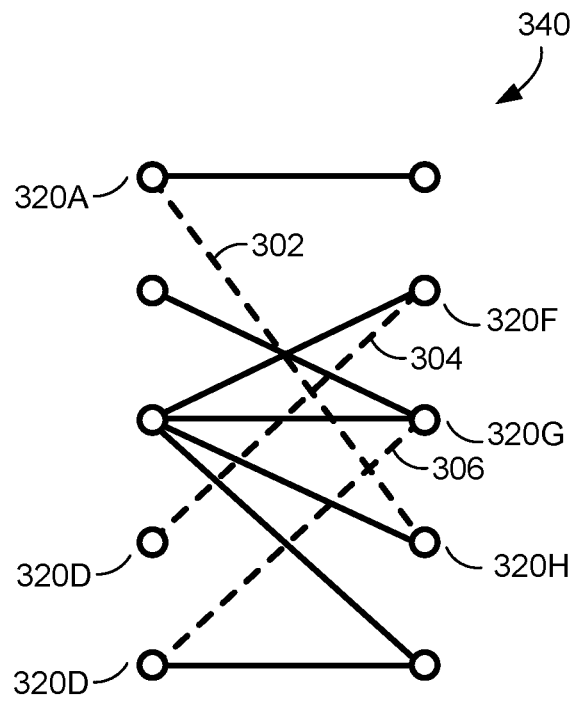
FIG. 3B illustrates an example initial matching for a bipartite graph determined based on a random subset of edges of the bipartite graph, in accordance with embodiments of the present invention.

FIG. 3B illustrates an initial matching 340 for the bipartite graph of FIG. 3A. The initial matching 340 may be determined or generated for a random subset of edges of the plurality of edges of the bipartite graph. The initial matching includes a selection of initial matched edges 302, 304, and 306. The initial matched edges are disjoint edges including pairs of node, such that each pair of initial matched nodes forming a matched edge includes nodes selected as one from the first nodes 320A-320A and one from the second nodes 320E-320I. For example, initial matched edge 302 includes a pair of initial matched nodes, first node 320A and second node 320H. Similarly, initial matched edge 304 includes another pair of matched nodes, first node 320D and second node 320F, and so on. The initial matched edges 302, 306, and 308 do not have any nodes in common.

Figure 3C:
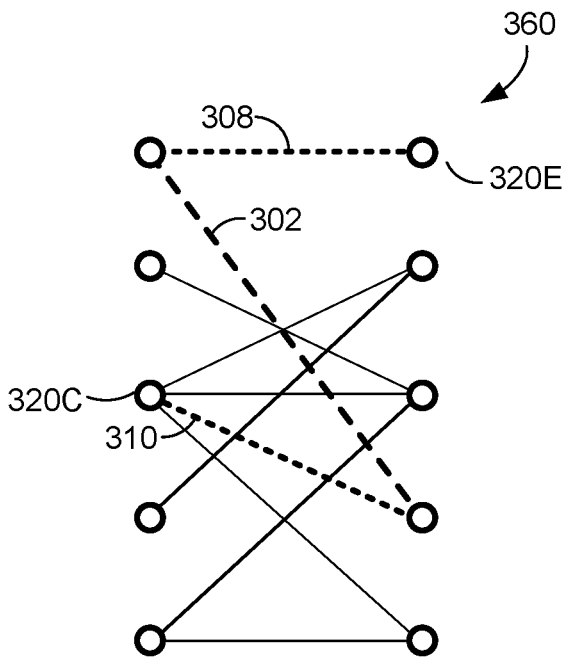
FIG. 3C illustrates of an alternating path with a set of adjacent edges, in accordance with embodiments of the present invention.

FIG. 3C illustrates an alternating path 360 with a set of adjacent edges. The alternating path 360 may include a set of adjacent edges 308, 302, and 310. The alternating path 360 is generated based on the initial matched edge 302 and the remaining edges, not included in the random subset of edges, of the plurality of edges of the input bipartite graph of FIG. 3A. The alternate path 360 for initial matched edge 302 starts with an unmatched node 320E and ends with another unmatched node 320C. Further, the alternating path 360 alternates between an unmatched edge 308 of the remaining edges, the initial matched edge 302, and the unmatched edge 310 of the remaining edges.

Figure 3D:
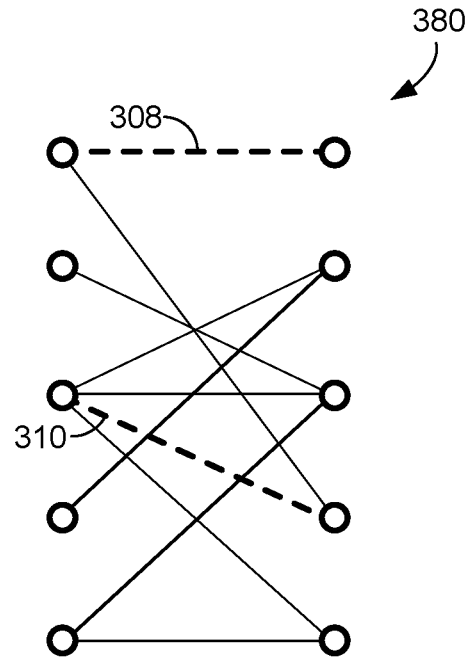
FIG. 3D illustrates a set of matched edges for an increased matching based on an alternating path generated from an initial matched edge, in accordance with embodiments of the present invention.

FIG. 3D illustrates a set of matched edges for an increased matching 380 based on an alternating path generated from an initial matched edge. The increased matching 380 based on the initial matched edge 302 includes a set of matched edges 308 and 310 derived by removing the initial matched edge 302 and including the remaining edges 308 and 310 from the set of adjacent edges 308, 302, and 310 that for the alternating path 360. In this way, for each initial matched edge, the increased matching may include two matched edges, thus increasing the number of matched edges in the increased 1 matching for the entirety of the input bipartite graph.

Figure 4B:
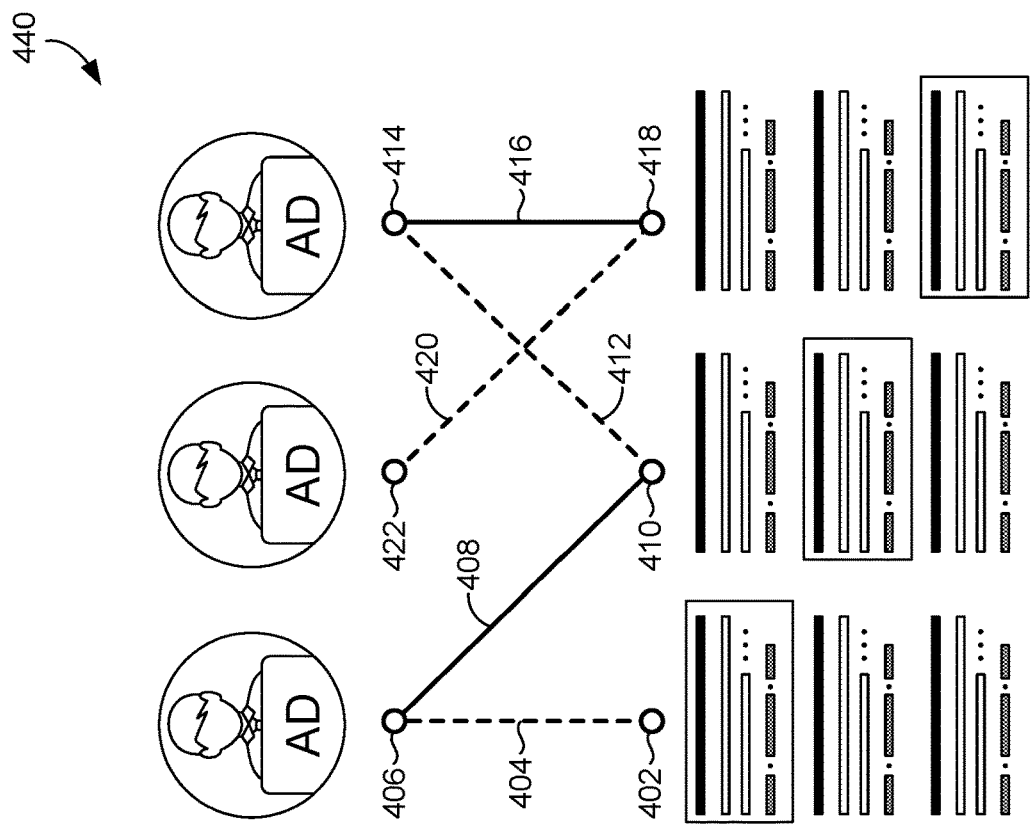
FIG. 4B illustrates an example increased matching for a bipartite graph representing a data stream in an advertising platform, in accordance with embodiments of the present invention.
Figure 4A:
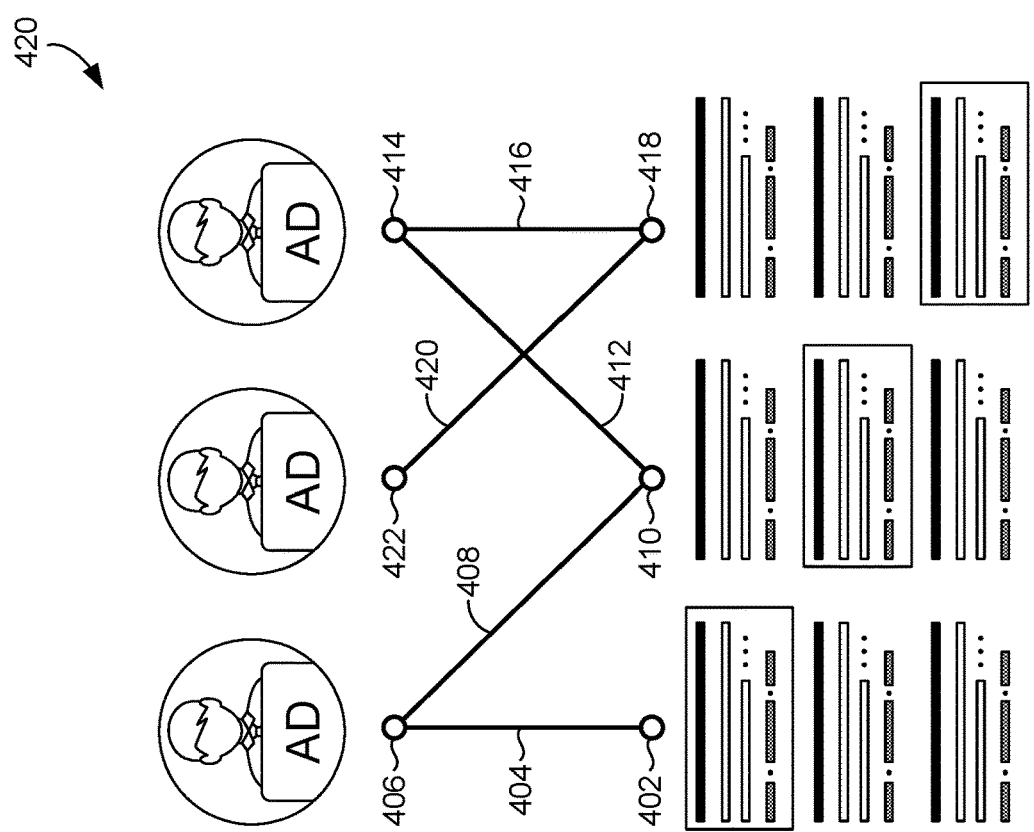
FIG. 4A illustrates an example bipartite graph representing a data stream in an advertising platform, in accordance with embodiments of the present invention.

Referring now to FIGS. 4A-4B, FIGS. 4A-4B are illustrations of example increased matching for a bipartite graph representing a data stream in an advertising platform, in accordance with some embodiments of the present disclosure. FIG. 4A illustrates an example bipartite graph 420 representing a data stream in an advertising platform. The data stream in an advertising platform represents advertisements and potential positions for the advertisements on the advertising platform. Further, the data stream includes preferences for positions associated with each advertisement as provided by advertisers of the corresponding advertisements. The bipartite graph 420 includes first nodes representing advertisements 406, 422, and 414. The bipartite graph 420 also includes second nodes representing positions 402, 410, and 418 available for advertisements on the advertising platform. The first nodes (406, 422, and 414) represent advertisements. Edges 404, 408, 412, 416, and 420 represent relationships between the connected advertisement and the position. For example, advertisement 406 may have attributes representing preferred positions 402 and 410 requested by the advertiser of the advertisement 406. As such, edges 404 and 408 represent the positions 402 and 410 preferred or requested for the connected advertisement 406. Similarly, each advertisement 422 and 414 may have associated attributes pointing to preferred positions, and edges connecting advertisements 422 and 414 with corresponding positions may reflect those attributes.

FIG. 4B illustrates an example increased matching 440 for a graph representing a data stream in the advertising platform according to the present disclosure, utilizing the system and methods described above in connection with FIGS. 1 and 3. The increased matching 440 may include matched edges 404, 412, and 420. The matched edges 404, 412, and 420 may be disjoint edges such that the increased matching 440 increased the number of matched edges in the input bipartite graph 420 of FIG. 4A. The matched edges 404, 412, and 420 may not share any nodes in common. Further, the matched edges 404, 412, 420 may increase the number of nodes in the input bipartite graph 420 matched in the increased matching 440. Based on the increased matching, a graph-based task may include presenting the advertisement 406 at position 402, advertisement 422 at position 418, and advertisement 414 at position 410 on the advertising platform.

Figure 5B:
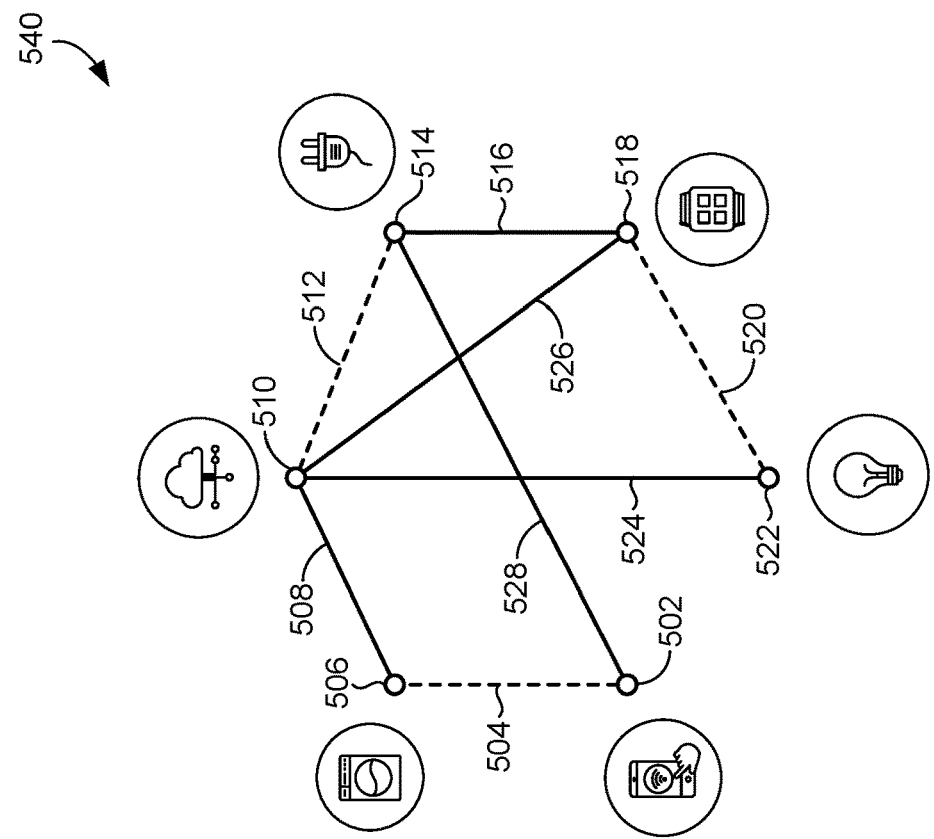
FIG. 5B illustrates an example increased matching for a bipartite graph representing a data stream in an Internet of Things platform, in accordance with embodiments of the present invention.
Figure 5A:
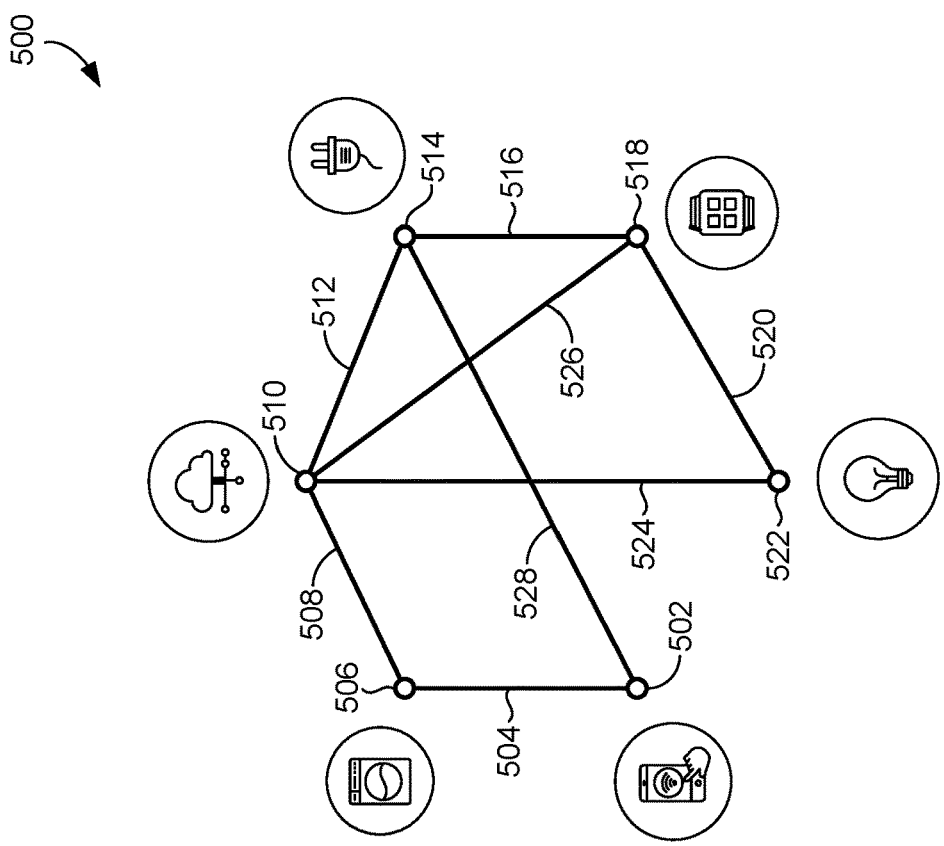
FIG. 5A illustrates an example bipartite graph representing a data stream in an Internet of Things platform, in accordance with embodiments of the present invention.

Referring to FIGS. 5A-5B, FIGS. 5A-5B are illustrations of example increased matching for an input graph representing a data stream in an Internet of Things (IoT) platform, in accordance with some embodiments of the present disclosure. FIG. 5A illustrates an example input graph 500 representing a data stream in an IoT platform. The data stream in the IoT platform represents a variety of devices (502, 506, 510, 512, 514, 518, and 522) in an IoT network. The devices may be low-power devices (e.g., sensors) and high power devices. Further, the data stream also has representations or data points for existing or potential connections between the devices in the network. A connection may also represent low-power devices that may connect to another device to send data for further processing. The input graph 500 includes first nodes representing devices 502, 506, 510, 512, 514, 518, and 522. Edges 504, 508, 512, 516, 520, 524, 526, and 520 in the input graph 520 represent existing or potential connections between the devices. The connections represent connections between devices such that one is a low-power device that can send data to the other device for further processing. For example, device 518 (e.g., a smart watch) may be able to connect to device 522 (e.g., a light source) where a sensor in the light source may be able to send data to the device 522 for processing. Similarly, each device may be connected to or be capable of connecting to one or more other devices in the IoT network for such transfer of data.

FIG. 5B illustrates an example increased matching 540 for an input graph representing a data stream in the IoT platform according to the present disclosure, utilizing the system and methods described above in connection with FIGS. 1 and 3. The increased matching 540 may include matched edges 504, 512, and 520. The matched edges 504, 512, and 520 may be disjoint edges such that the increased matching 540 increased the number of matched edges in the input graph 500 of FIG. 5A. The matched edges 504, 512, and 520 may not share any nodes in common. Further, the matched edges 504, 512, 520 may increase the number of nodes in the input graph 500 matched (e.g., nodes 502, 506, 510, 514, 518, and 522) in the increased matching 540. Based on the increased matching, a graph-based task may include sending data from one matched device to its corresponding matched device for processing when needed. For example, data can be sent from device 502 to device 506 for processing when device 502 activates device 506. The increased matching of devices in the IoT platform may allow for finding and healing coverage holes in the IoT network by sending data to process from one matched device to its corresponding matched device when coverage is low for the one matched device.

Exemplary Flow Diagrams

Figure 6:
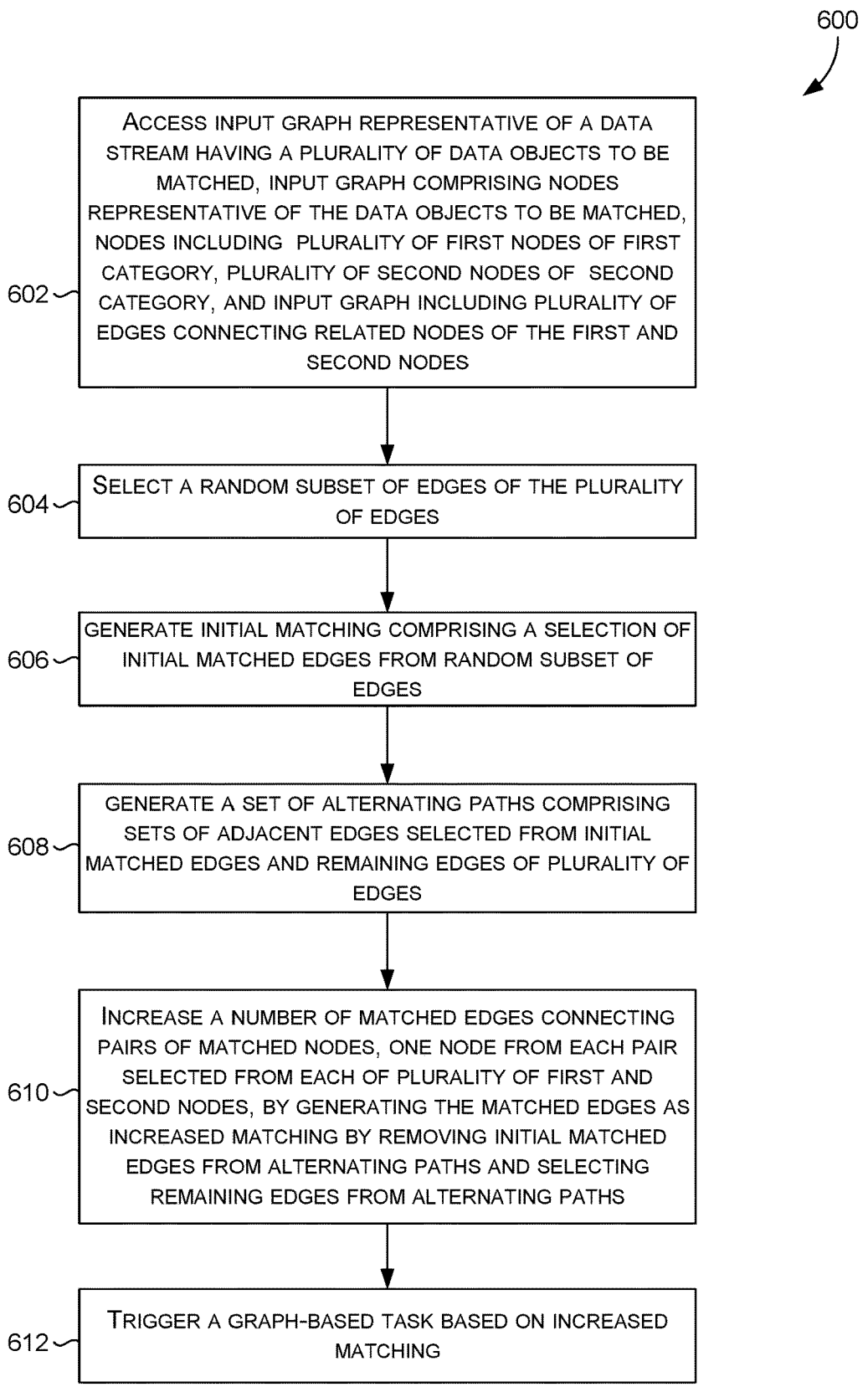
FIG. 6 is a flow diagram showing a method for determining an increased matching for an input bipartite graph, in accordance with embodiments of the present invention.
Figure 7:
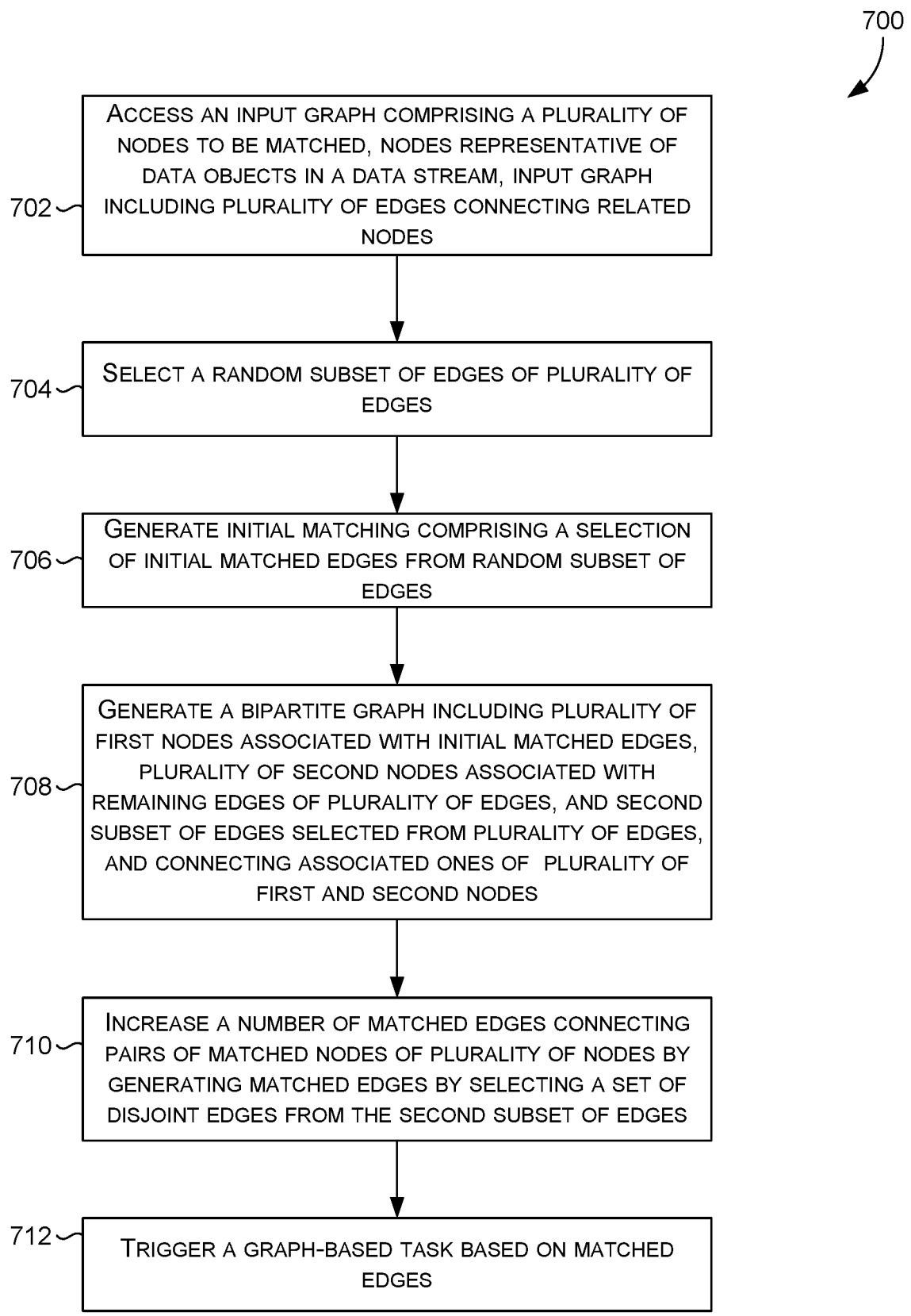
FIG. 7 is a flow diagram showing another method for determining an increased matching for an input general graph, in accordance with embodiments of the present invention.

With reference now to FIGS. 6-7, flow diagrams are provided illustrating methods for determining increased matching for input graphs according to the present disclosure. Each block of the methods 600 and 700 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 6, FIG. 6 illustrates a method 600 for generating an increased matching for an input bipartite graph, in accordance with embodiments described herein. Initially, at block 602, an input graph comprising nodes to be matched is accessed. The input graph is representative of a data stream having a plurality of data objects. The nodes may represent the data objects and include a plurality of first nodes of a first category, a plurality of second nodes of a second category. The input graph further including a plurality of edges connecting related nodes of the first and second nodes. The input graph may be accessed from a graph generator, such as the graph generator 132 of FIG. 1. The graph generator 132 may generate the input graph based on a data stream including nodes of two different categories.

At block 604, a random subset of edges of the plurality of edges is selected. A random edge selector, such as the random edge selector 134 of FIG. 1. The edges of the random subset of edges may be randomly selected from the plurality of edges in the input graph. A number of edges in the random subset of edges may be based on the total number of edges in the plurality of edges, and the total number of nodes in the first and the second nodes.

Next, at block 606, an initial matching comprising a selection of initial matched edges from the random subset of edges is generated. An initial matcher, such as the initial matcher 136 of FIG. 1, may be used to generate an initial matching in the random subset of edges. In some examples, the initial matcher 136 may use a greedy matching algorithm to generate the initial matching comprising the selection of initial matched edges from the random subset of edges as described in detail above.

At block 608, a set of alternating paths comprising sets of adjacent edges is generated. The sets of adjacent edges may be selected from the initial matched edges and remaining edges of the plurality of edges. A path determiner, such as the path determiner 138 of FIG. 1, may be used to generate the set of alternating paths. The alternating paths may be selected from the initial matched edges and the remaining edges, such that the path alternates between the initial matched edges and the remaining edges.

Further, at block 610, a number of matched edges connecting pairs of matched nodes is increased. The matched nodes include one node from each pair selected from each of the plurality of first nodes and the plurality of second nodes. The matched edges are generated as an increased matching by removing the initial matched edges from the alternating paths and selecting the remaining edges from the alternating paths. An increased matcher, such as the increased matcher 140 of FIG. 1, may generate the matched edges as an increased matching. The matched edges may include the remaining edges in the alternating paths and may not include the initial matched edges in the alternating paths.

At block 612, a graph-based task is triggered based on the increased matching. The graph-based task comprises presenting a representation of the increased matching associated with the data objects of the data stream. A match presenter, such as the match presenter 142 of FIG. 1, may be used to trigger the graph-based task based on the increased matching. The matched nodes may be presented via a user interface of a client device, such as the client device 110 of FIG. 1.

Now turning to FIG. 7, FIG. 7 illustrates a method 700 for generating an increased matching for an input general graph, in accordance with embodiments described herein. Initially, at block 702, an input graph is accessed. The input graph comprises a plurality of nodes representative of data objects in a data stream to be matched, and a plurality of edges connecting related nodes of the plurality of nodes. An input graph, such as the input graph G 210 of FIG. 2, may be accessed. The input graph may include a plurality of nodes to be matched and edges connecting related nodes of the plurality of nodes. The input graph may be a general graph.

At block 704, a random subset of edges of the plurality of edges is selected. A random edge selector can be used, such as the random edge selector 134 of FIG. 1. The edges of the random subset of edges may be randomly selected from the plurality of edges in the input graph. A number of edges in the random subset of edges may be based on the total number of edges in the plurality of edges, and the total number of nodes in the plurality of nodes.

Next, at block 706, an initial matching comprising a selection of initial matched edges from the random subset of edges is generated. An initial matching component, such as the initial matching component 212 of FIG. 2, may be used to generate an initial matching, such as initial matching 214 of FIG. 2, in the random subset of edges. In some examples, the initial matching component 212 may use a greedy matching algorithm to generate the initial matching comprising the selection of initial matched edges from the random subset of edges.

At block 708, a bipartite graph is generated including a plurality of first nodes associated with the initial matched edges, and a plurality of second nodes associated with remaining edges of the plurality of edges. The bipartite graph includes a second subset of edges selected from the plurality of edges, and connecting associated ones of the plurality of first nodes and the plurality of second nodes. The bipartite graph, such as graph G' of FIG. 2, may be generated. The bipartite graph may include a plurality of first nodes corresponding to the initial matched edges and a plurality of second nodes corresponding to remaining edges of the input graph. The remaining edges may be edges of the plurality of edges not included in the random subset of edges.

At block 710, a number of matched edges connecting pairs of matched nodes of the plurality of nodes is increased. The matched edges are generated by selecting a set of disjoint edges from the second subset of edges. The matched edges for the input graph, such as the increased matching for graph G 220 of FIG. 2, may be determined via an increased matching component, such as the increased matching component 218 of FIG. 2 using a bipartite matching algorithm to find an increased or maximal matching in the bipartite graph, such as the graph G' of FIG. 2.

Next, at block 712, a graph-based task may be triggered based on the matched edges. A match presenter, such as the match presenter 142 of FIG. 1, may be used to trigger the graph-based task based on the matched edges. The matched nodes may be presented via a user interface of a client device, such as the client device 110 of FIG. 1

Exemplary Operating Environment

Figure 8:
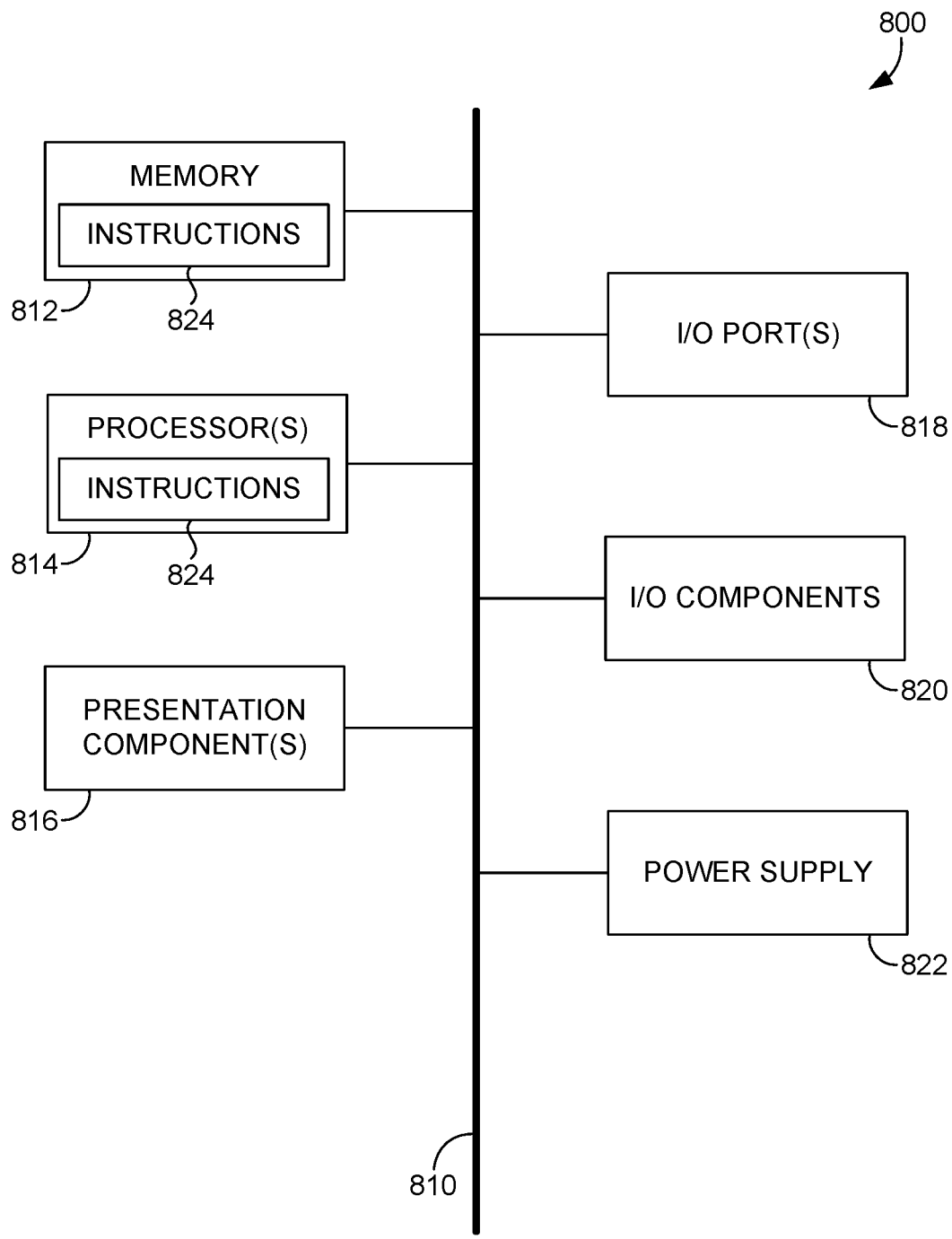
FIG. 8 is a block diagram of an exemplary computing device suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media is non-transitory and does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, touch pad, touch screen, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 800. Computing device 800 may be equipped with depth cameras, such as stereoscopic camera systems, infrared camera systems, RGB camera systems, touchscreen technology, and combinations of these, for gesture detection and recognition. Additionally, the computing device 800 may be equipped with accelerometers or gyroscopes that enable detection of motion. The output of the accelerometers or gyroscopes may be provided to the display of computing device 800 to render immersive augmented reality or virtual reality.

Embodiments described herein support increased matching for large data streams based on leveraging inherent randomness of the data received in the data streams. The components described herein refer to integrated components of a single-pass matching system. The integrated components refer to the hardware architecture and software framework that support functionality using the single-pass matching system. The hardware architecture refers to physical components and interrelationships thereof and the software framework refers to software providing functionality that can be implemented with hardware embodied on a device.

The end-to-end software-based single-pass matching system can operate within the matching system components to operate computer hardware to provide matching system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the single-pass matching system components can manage resources and provide services for the single-pass matching system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method comprising:
    accessing an input graph representative of a data stream having a plurality of data objects to be matched, the input graph comprising nodes representative of the data objects to be matched, the nodes including a plurality of first nodes of a first category, a plurality of second nodes of a second category, and the input graph including a plurality of edges connecting related nodes of the first and second nodes;
selecting a random subset of edges of the plurality of edges;
increasing a number of matched edges connecting pairs of matched nodes, one node from each pair selected from each of the plurality of first nodes and the plurality of second nodes by:
generating an initial matching comprising a selection of initial matched edges from the random subset of edges;
generating a set of alternating paths comprising sets of adjacent edges selected from the initial matched edges and remaining edges of the plurality of edges; and
generating the matched edges as an increased matching by removing the initial matched edges from the alternating paths and selecting the remaining edges from the alternating paths; and
triggering a graph-based task based on the increased matching, wherein the graph-based task comprises causing a presentation of a representation of the increased matching associated with the data objects of the data stream.

2. The method of claim 1, further comprising:
receiving the nodes in the data stream, wherein accessing the input graph comprises generating the input graph as a bipartite graph based on the first and the second categories.

3. The method of claim 1, wherein a number of edges in the random subset of edges is selected based on a total number of edges in the plurality of edges and a total number of nodes in the plurality of first nodes and the plurality of second nodes.

4. The method of claim 3, wherein the edges in the random subset of edges are selected randomly from the plurality of edges.

5. The method of claim 1, wherein the set of adjacent edges alternates between initial matched edges of the random subset of edges and unmatched edges of the plurality of edges, and starts and ends with an unmatched node.

6. The method of claim 1, wherein the initial matching is a maximal matching determined using a greedy matching algorithm.

7. The method of claim 1, further comprising:
receiving an additional edge; and
in response to receiving the additional edge, updating the increased matching by re-determining the set of alternating paths based on the additional edge.

8. The method of claim 1, further comprising associating weights with the matched edges based on a similarity score comparing related attributes of corresponding pairs of the matched nodes.

9. The method of claim 8, wherein the input graph represents a streaming video, the plurality of first nodes includes a first half of a plurality of frames of the streaming video, the plurality of second nodes includes a second half of the plurality of frames, the plurality of edges represents a similarity between the related nodes of the first and second nodes, and the increased matching represents key frames forming a summary of the streaming video, and wherein the graph-based task includes presenting the key frames as the summary of the streaming video.

10. The method of claim 8, wherein the input graph represents the data stream from a recommendation application, wherein the plurality of first nodes includes users of the recommendation application and the plurality of second nodes includes items available for recommendation, and the increased matching represents matching users with items to recommend, and wherein the graph-based task includes presenting a matched user with a matched item based on the increased matching.

11. The method of claim 8, wherein the input graph represents the data stream from an advertising platform, the plurality of first nodes includes advertisements, the plurality of second nodes includes positions available for advertisements on the advertising platform, the plurality of edges represents a preference of advertisers to place advertisements at positions, and the increased matching represents a matching between advertisements and positions for presentation of the advertisements within the advertising platform, and wherein the graph-based task includes presenting a matched advertisement at a matched position within the advertising platform based on the increased matching.

12. The method of claim 8, wherein the input graph represents the data stream of a freelancing platform, the plurality of first nodes includes freelancers, the plurality of second nodes includes clients requiring freelancers, and the increased matching represents a matching between freelancers and clients for job positions, and wherein the graph-based task includes presenting a matched freelancer to a matched client for a job position based on the increased matching.

13. The method of claim 8, wherein the input graph represents an Internet of Things (IoT) platform, the plurality of first nodes includes low power devices and the plurality of second nodes includes high power devices in the IoT platform, and the increased matching represents a matching between low power devices and high power devices such that a matched low power device may optimally send data for analysis to a corresponding matched high power device when the analysis requires more power than the matched low power device has available, and the graph-based task includes sending data from the matched low power device to the matched high power device in response to detecting low power in the matched low power device.

14. One or more computer storage media storing computer-useable instructions that, when used by one or more computing devices, cause the one or more computing devices to perform operations comprising:
accessing an input graph comprising a plurality of nodes to be matched, the nodes representative of data objects in a data stream, the input graph including a plurality of edges connecting related nodes of the plurality of nodes;
selecting a random subset of edges of the plurality of edges;
increasing a number of matched edges connecting pairs of matched nodes of the plurality of nodes by:
generating an initial matching comprising a selection of initial matched edges from the random subset of edges;
generating a bipartite graph including a plurality of first nodes associated with the initial matched edges, a plurality of second nodes associated with remaining edges of the plurality of edges, and a second subset of edges selected from the plurality of edges, and connecting associated ones of the plurality of first nodes and the plurality of second nodes; and
generating the matched edges by selecting a set of disjoint edges from the second subset of edges; and
triggering a graph-based task based on the matched edges.

15. The computer storage media of claim 14, the operations further comprising selecting a number of edges in the random subset of edges based on a total number of edges in the plurality of edges and a total number of nodes in the input graph.

16. The computer storage media of claim 14, wherein selecting the random subset of edges includes randomly selecting edges from the plurality of edges.

17. The computer storage media of claim 14, wherein determining the initial matching is based on a greedy matching algorithm.

18. A computing system comprising:
one or more hardware processors and memory configured to provide computer program instructions to the one or more hardware processors;
an increased matcher configured to use the one or more hardware processors to:
access an input graph comprising nodes to be matched, the nodes representative of data objects in a data stream, the nodes including a plurality of first nodes of a first category, a plurality of second nodes of a second category, and the input graph including a plurality of edges connecting related nodes of the first and second nodes; and
select a random subset of edges of the plurality of edges, wherein selecting a number of edges in the random subset of edges is based on a total number of edges in the plurality of edges and a total number of nodes in the plurality of first nodes and the plurality of second nodes;
determine an initial matching comprising a selection of initial matched edges from the random subset of edges;
a means for generating an increased matching by increasing, based on the initial matched edges, a number of matched edges connecting pairs of matched nodes, one node from each pair selected from each of the plurality of first nodes and the plurality of second nodes; and
a match presenter for triggering a graph-based task based on the increased matching.

19. The computing system of claim 18, further comprising:
a means for receiving an additional edge, and responsive to receiving the additional edge, updating the increased matching by recalculating the alternating paths based on the additional edge.

20. The computing system of claim 18, wherein generating the increased matching comprises:
determining a set of alternating paths comprising sets of adjacent edges selected from the initial matched edges and remaining edges of the plurality of edges; and
determining the matched edges as the increased matching by removing the initial matched edges from the alternating paths and selecting the remaining edges from the alternating paths.

* * * * *